US009920951B2

(12) United States Patent
Hebert

(10) Patent No.: US 9,920,951 B2
(45) Date of Patent: Mar. 20, 2018

(54) THERMAL RECOVERY SYSTEM AND METHOD

(71) Applicant: OLIVE TREE PATENTS 1 LLC, Lutz, FL (US)

(72) Inventor: Thomas H Hebert, Tampa, FL (US)

(73) Assignee: Olive Tree Patents 1 LLC, Lutz, FL (US)

( * ) Notice: Subject to any disclaimer, the term of this patent is extended or adjusted under 35 U.S.C. 154(b) by 171 days.

(21) Appl. No.: 14/854,846

(22) Filed: Sep. 15, 2015

(65) Prior Publication Data

US 2016/0033166 A1 Feb. 4, 2016

Related U.S. Application Data

(63) Continuation of application No. PCT/US2014/021795, filed on Mar. 7, 2014.
(Continued)

(51) Int. Cl.
| | |
|---|---|
| F25B 7/00 | (2006.01) |
| F24H 4/02 | (2006.01) |
| F25B 13/00 | (2006.01) |
| F25B 30/02 | (2006.01) |
| F25B 40/02 | (2006.01) |

(Continued)

(52) U.S. Cl.
CPC .............. *F24H 4/02* (2013.01); *F24D 15/04* (2013.01); *F24D 17/02* (2013.01); *F25B 13/00* (2013.01); *F25B 30/02* (2013.01); *F25B 40/02* (2013.01); *F25B 40/04* (2013.01); *F24D 2200/123* (2013.01); *F24F 2221/54* (2013.01); *F25B 2339/047* (2013.01); *Y02B 30/12* (2013.01)

(58) Field of Classification Search
CPC .......... F25B 7/00; F25B 29/003; Y02B 30/12
USPC .................................. 62/79, 238.6, 236.7
See application file for complete search history.

(56) References Cited

U.S. PATENT DOCUMENTS

| | | |
|---|---|---|
| 2,548,508 A | 4/1951 | Wolfner |
| 2,893,218 A | 7/1959 | Harnish |

(Continued)

FOREIGN PATENT DOCUMENTS

EP 0061349 A2 * 9/1982 ............ F25B 29/003

*Primary Examiner* — Melvin Jones

(74) *Attorney, Agent, or Firm* — Christopher Paradies; Paradies Law P.A.

(57) ABSTRACT

An apparatus comprises a subcooler, such as a vented tube/plate or tube on tube heat exchanger, and a pre-cooler and/or post-heater, which may be a vented tube/plate or tube on tube heat exchanger. The subcooler and pre-cooler and/or post-heater are connected in fluid communication with each other (in series) and with a refrigerant output and input of a condenser. For example, the refrigerant output goes into the subcooler, and the refrigerant input comes out of the pre-cooler and/or post-heater. A working fluid (e.g. coolant), such as water or glycol or other working fluid, is forced, such as by pumping, first through the subcooler and then through the precooler and/or post-heater. Flow rate of the working fluid through the apparatus may be regulated such that the refrigerant is first subcooled to an incoming fluid's temperature and then to pre-cool the refrigerant to approximately its saturated-vapor state, when the system is operating to provide a refrigeration effect. Heat absorbed by the working fluid using the method may heat a potable hot water system or as a secondary heat source.

16 Claims, 20 Drawing Sheets

Related U.S. Application Data

(60) Provisional application No. 61/801,894, filed on Mar. 15, 2013.

(51) Int. Cl.
*F25B 40/04* (2006.01)
*F24D 15/04* (2006.01)
*F24D 17/02* (2006.01)

(56) References Cited

U.S. PATENT DOCUMENTS

| | | | |
|---|---|---|---|
| 2,975,609 A | | 3/1961 | Allander et al. |
| 3,188,829 A | | 6/1965 | Siewert et al. |
| 3,362,184 A | | 1/1968 | Jensen |
| 3,976,123 A | | 8/1976 | Davies |
| 4,089,667 A | | 5/1978 | Jonsson |
| 4,098,092 A | | 7/1978 | Singh |
| 4,173,865 A | | 11/1979 | Sawyer |
| 4,316,366 A | * | 2/1982 | Manning .................. F25B 5/00 62/200 |
| 4,696,168 A | * | 9/1987 | Woods .................. F25B 5/02 165/145 |
| 6,237,359 B1 | * | 5/2001 | Hebert .................. A61B 17/322 62/348 |
| 2005/0028545 A1 | * | 2/2005 | Hebert .................. F24F 12/006 62/274 |

\* cited by examiner

THERMAL RECOVERY SYSTEM AND METHOD

CROSS RELATED APPLICATIONS

This application is a continuation of PCT/US2014/021795 filed Mar. 7, 2014 which claims priority to U.S. Prov. Appl. No. 61/801,894, which was filed Mar. 15, 2013 and is incorporated in its entirety herein.

FIELD OF THE INVENTION

The field relates to air conditioning and heating systems that include a refrigeration system and improving the efficiency of such systems.

BACKGROUND

Many different types of cooling systems presently exist, such as systems operating a thermal transfer cycle to remove heat from one heat sink region and transfer this heat to a different heat sink region, including reverse cycle heat pumps and vapor-compression refrigeration systems such as air conditioners, refrigerators, freezers and water chillers. Water heating is known to be accomplished by resistive heating, burning of fuel, chemical reaction and the like. Some relevant references are the following: U.S. Pat. No. 2,548,508, April 1951 to Wolfner; U.S. Pat. No. 2,893,218, July 1959 to Harnish; U.S. Pat. No. 2,975,609, March 1961 to Allander et al.; U.S. Pat. No. 3,188,829, June 1965 to Siewept et al.; U.S. Pat. No. 3,362,184, January 1968 to Jensen; U.S. Pat. No. 3,976,123, August 1976 to Davies; U.S. Pat. No. 4,089,667, May 1978 to Jonsson; U.S. Pat. No. 4,098,092, July 1978 to Singh; U.S. Pat. No. 4,173,865, November 1979 to Sawyer.

A thermal transfer cycle for cooling may be accomplished by a compressor, condenser, throttling device, and evaporator connected in serial fluid communication with one another in a refrigeration cycle. The system is charged with a refrigerant which circulates through each of the components to remove heat from the evaporator and transfer heat to the condenser. During operation, the compressor compresses the refrigerant from a saturated-vapor state to a super-heated vapor state thereby increasing the temperature, enthalpy, and pressure of the refrigerant. The refrigerant then flows through the condenser which condenses the refrigerant at a substantially constant pressure to a saturated-liquid state. The throttling device reduces the pressure of the refrigerant thereby causing the refrigerant to change to a mixed liquid-vapor state. The refrigerant then flows through the evaporator which causes the refrigerant to return at a constant pressure to its saturated-vapor state thereby completing the thermal transfer cycle. The cycle requires energy to transfer the heat from one location to another.

In refrigeration, it is readily apparent that the condenser plays a major role in the refrigeration cycle, which is a thermal transfer cycle. The most common type of condenser presently in use for domestic systems is commonly referred to as an "air-cooled condenser". Such air-cooled condensers typically operate by subjecting the condenser to a flow of free air which absorbs the heat being discharged by the condenser. The advantages of such air condensers include the low cost of moving the free air by fans powered by electric motors, the availability of air, and the ease of discharging the heat laden air. The disadvantages of such air condensers is the need for an extremely large heat exchange surface area of the condenser to effect the heat exchanging relationship between the refrigerant passing through the condenser and the flow of free air, the relatively high head pressure involved on the compressor, the fluctuating humidity and temperature of the air, and the lack of any significant subcooling of the liquid refrigerant flowing from the condenser of standard operating conditions. Because of such problems, the air-type condensers are used in conjunction with relatively small refrigeration systems such as those commonly used for domestic purposes.

The second most prevalent type of condenser is what is commonly referred to as a water-cooled condenser in which water is circulated about or through the condenser to absorb the latent heat of condensation of the refrigerant as the refrigerant is condensed within the condenser. The advantages of such water cooled condensers are the fact that the condenser drops the head pressure off the compressor very rapidly, thereby reducing the pressure differential across the compressor. The amount of electric current required to power the compressor is therefore substantially reduced. Moreover, water-cooled condensers cool the refrigerant by as much as 30.degrees. F. over that of an a-cooled condenser. Such subcooling increases the refrigerating effect of the refrigeration cycle by 18 percent to 37 percent or more. Unfortunately, the primary disadvantage of a water cooled condenser is the need for a great volume of water (approximately 2 to 3 gallons per minute per tonnage of cooling capacity as recommended by most manufacturers). Additionally, problems exist in discharging the heated water to the environment. For these reasons, water cooled condensers are typically found only on commercial refrigeration systems having cooling capacities greater than 3 tons (12,000 British Thermal Units per hour) and are subject to government regulation.

In order to reduce the volume of water discharged in a water-cooled condenser, various water tower condensers have been designed. Typical water tower condensers comprise a reservoir of water which is pumped through a water/refrigerant heat exchanger. The water absorbs heat of condensation of the refrigerant. The absorbed heat in the water is then rejected into the atmosphere by evaporation of some of the water, with the heat of vaporization of the water being used to cool the remaining water. It is noted that due to the evaporation of water, a supply of water must be continually fed to the reservoir to maintain the reservoir at a proper water level. The equilibrium water temperature attainable is equal to the ambient wet bulb temperature. This causes similar problems as noted on air-cooled condensers, because as ambient wet bulb temperature increases, the efficiency of the condenser decreases. Cooling towers of this type are highly regulated and require permits for the use of water.

SUMMARY

An apparatus and method is provided for precooling and subcooling a refrigerant as the refrigerant flows into and is discharged from the condenser of a refrigeration system. For example, a combination subcool and precool thermal recovery system for subcooling and precooling a refrigerant passing through a condenser of a thermal transfer system produces, surprisingly, up to 4 to 5 times the heat recovery of a standard waste heat recovery unit. A subcooler may be connected in fluid communication with an output of a condenser enabling a refrigerant to flow through the subcooler after first flowing through the condenser. A precooler connected in fluid communication with the input of the condenser enables the refrigerant to flow through the precooler before flowing through the condenser. For example, the subcooler includes a first heat exchanger, and the first heat exchanger provides a first working fluid to flow through the subcooler in a heat exchanging relationship with the refrigerant thereby subcooling the refrigerant. The precooler includes a second heat exchanger providing the first working (e.g. cooling) fluid to flow through the precooler and/or preheater after first flowing through the subcooler in a heat exchanging relationship with the refrigerant thereby precooling the refrigerant in this example. For example, heat exchangers being constructed may conform to requirements for potable water heat recovery (e.g. vented tube/plate, or tube on tube heat exchangers).

A means for controlling the rate of flow of the first and the second fluids flowing through the first and the second heat exchangers may comprise a valve system, which may meter the water within the system, whereby the refrigerant is subcooled and precooled to a substantially subcooled-liquid state and a substantially a saturated-vapor state, respectively. For example, potable hot water may be provided at a minimum 50° F. rise from incoming water supply temperatures, as a result of controlling the rate of flow.

In one example, the working fluid output of the first heat exchanger (e.g. coolant, such as water or glycol or other for secondary heat exchange fluid) is connected to the input of the second heat exchanger, and the first working fluid comprises the second working fluid which flows first through the first heat exchanger and then through the second heat exchanger thereby enabling the working fluid to subcool the refrigerant flowing from the condenser and to precool the refrigerant flowing into the condenser.

The first heat exchanger and the second heat exchanger may include a means for preventing the fluid from mixing with the refrigerant, such as a physical barrier, while providing for heat to be exchanged that conforms to the requirements for heating a potable hot water supply. One example is provided by a tube on tube heat exchanger, for example.

In one example, a subcool and precool system for subcooling and precooling a refrigerant passing through a condenser of a refrigeration system when the refrigeration system is operating to provide a cooling effect, may comprise an apparatus including a subcooler (e.g. a heat exchanger, such as a vented tube/plate or tube on tube heat exchanger, connected in fluid communication with the output of the condenser enabling the refrigerant to flow through the subcooler prior to flowing through to the evaporator; an apparatus including a precooler heat exchanger (vented tube/plate, or tube on tube design) connected in fluid communication with the input of the condenser enabling the refrigerant to flow through the precooler before flowing through the condenser. For example, the apparatus ay also include a first subcooler including a first heat exchanger (e.g. vented tube/plate or tube on tube) connected in fluid communication with the output of the condenser enabling a first working fluid (e.g. coolant), such as water (or glycol or other for secondary heat exchange) to flow through the subcooler in a heat exchanging relationship with the refrigerant thereby subcooling the refrigerant, without mixing the coolant and the refrigerant. The precooler may comprise a second heat exchanger (such as a vented tube/plate or tube on tube design), which may be connected in fluid communication with the input of the condenser and with the working (cooling) fluid output of the first heat exchanger (so-called Subcooler) enabling the working (cooling) fluid, such as water (or glycol or other for secondary heat exchange) to flow through the precooler after flowing first through the subcooler in a heat exchanging relationship with the refrigerant, precooling the refrigerant.

For example, a working (cooling) fluid, such as water (or glycol or other for secondary heat exchange) output of the first heat exchanger may be connected to the working (cooling) fluid input, such as water (or glycol or other for secondary heat exchange) of the second heat exchanger, such that the first fluid comprises the second fluid which flows first through the first heat exchanger (Subcooler) and then through the second heat exchanger (Precooler) thereby enabling the fluid to subcool the liquid refrigerant flowing from the condenser and then to precool the hot gas refrigerant flowing into the condenser.

In one example, the first heat exchanger and the second heat exchanger include a means for preventing the working (cooling) fluid from mixing with the refrigerant, while providing a heat exchanger that conforms to the requirements for heating potable hot water. The first heat exchanger (vented tube/plate or tube on tube design) may include a first fluid conduit disposed in a heat exchanging relationship with a first refrigerant conduit thereby enabling the fluid to subcool the liquid refrigerant as the fluid and the refrigerant flow counterflow to one another through the first fluid conduit and the first refrigerant conduit, respectively.

A second heat exchanger (e.g. vented tube/plate or tube on tube design) may include a second fluid conduit disposed in a heat exchanging relationship with a second refrigerant conduit thereby enabling the working (cooling) fluid to precool the refrigerant as the fluid and the refrigerant flow counterflow to one another through the second fluid conduit and the second refrigerant conduit, respectively. An output of the first working (cooling) fluid conduit may be connected in fluid communication to an input of the second working (cooling) fluid conduit, allowing the fluid to flow first through the first fluid conduit and then through the second fluid conduit. The working (cooling) fluid input of the first refrigerant conduit (subcooler) being connected in fluid communication from the output of the first refrigerant conduit (subcooler) to the input of the second refrigerant conduit (precooler) whereby the working (cooling) fluid flowing from the subcooler sequentially flows through the second refrigerant conduit (precooler). The suggestions in parentheticals express examples in this paragraph and in other paragraphs, unless the context or express language indicates otherwise.

Then, the working fluid may be dispensed to a hot water system, either to heat potable water or as potable water, or to discharge, recycled cooling or other use. The output of the second refrigerant conduit may be connected in fluid communication with the input of the condenser whereby the refrigerant flows through the second refrigerant conduit prior to flowing into the condenser, for example.

A method for increasing the efficiency and cooling capacity of a refrigeration system including an evaporator, a compressor, and a condenser operating in a refrigerating mode, comprising the steps of: subcooling a refrigerant flowing from a condenser; precooling the refrigerant prior to the refrigerant flowing through the condenser, by flowing a second pass of the working (cooling) fluid, having a temperature less than a hot gas temperature of the refrigerant, in a heat exchanging relationship with the refrigerant, whereby the temperature of the hot gas refrigerant is decreased to greater than or about the refrigerant's saturated-vapor state, such that the refrigerant actually performs some phase change, for example; flowing of a first pass of the working (cooling) fluid, having a temperature less than the temperature of the liquid refrigerant, in a heat exchanging relationship with the refrigerant whereby the temperature of the refrigerant is decreased to greater than or about the temperature of the incoming working (cooling) fluid; and regulating the flow rate of the working (cooling) fluid to subcool the liquid refrigerant flowing from the condenser to a subcooled-liquid state and to precool the hot gas refrigerant flowing into the condenser to at least a saturated-vapor state in at least two passes of the working (cooling) fluid in heat exchange relationship with the refrigerant. In one example, the first working (cooling) fluid in a first pass is different than a second working (cooling) fluid in a second pass. In an alternative example, the fluid is the same fluid in each pass, but the temperature of the working fluid is not the same. In one example, the working (cooling) fluid first flows in a heat exchanging relationship with the refrigerant flowing from the condenser and then flows in a heat exchanging relationship with the refrigerant flowing into the condenser. In one example, a flow rate of the working (cooling) fluid is increased to precool the refrigerant flowing into the condenser to a mixed-phase state. The outflow of the working (cooling) fluid from the Subcool/precool apparatus may be coupled to a storage tank for use as potable hot water, for example. When water temperature of exiting/returning(circulated)(from the hot water storage tank) rises above normal water temperature of supply to subcool/precool apparatus, the water supply from the subcool/precool apparatus may be redirected to a cooling system for the heated working (cooling) fluid, whereby the heated working (cooling) fluid is cooled by heat exchange, such as heat exchange with the earth, evaporative cooling (water tower, swamp cooler or similar, or discharged to drain, using an incoming supply of water from well, city or other potable water supply to replace the water discharged, for example. When evaporative cooling is used, the best source for make-up water may be condensate discharge from A/C units or if not available, use of other water sources. The normal consumption of water for this evaporative process is approximately 0.57 lbsd of water per hour of R/O or condensate water. If R/O water is required, the total water consumption would be approximately 2¼ gallons per hour per ton per HP or ton of system capacity, a surprisingly modest water consumption rate. The consumption of water per HP or ton of system capacity, if water supply is dumped after use in the Subcool/precool apparatus, may be approximately 0.25 GPM (15 GPH) per HP or ton of system capacity.

In one example, a precool and subcool system for precooling and subcooling a refrigerant passing through a condenser of a refrigeration system is operating in a cooling mode, comprising a precooler refrigerant conduit connected in fluid communication with the input of the condenser enabling the refrigerant to flow through the precooler refrigerant conduit prior to flowing through the condenser; a subcooler refrigerant conduit connected in fluid communication with the output of the condenser enabling the refrigerant to flow through the subcooler after flowing through the condenser; a subcooler working (cooling) fluid conduit disposed in a heat exchanging in relationship with the subcooler refrigerant conduit; a precooler working (cooling) fluid conduit disposed in a heat exchanging in relationship with the precooler refrigerant conduit; and a coupling for connecting the output of the subcooler working (cooling) fluid conduit in fluid communication with the input of the precooler fluid conduit enabling a working (cooling) fluid to flow first through the subcooler fluid conduit and then through the precooler fluid conduit thereby subcooling the refrigerant flowing from the condenser and precooling the refrigerant flowing into the condenser. For example, an apparatus and method may function to heat the working (cooling) fluid, which is used to cool the liquid and hot gas refrigerant before and after the air cooled condenser, for consumption in a potable hot water system or as a heat exchange medium for heating water in a potable hot water system. For example, the apparatus and method may be incorporated into any type of refrigeration device or straight cooled air conditioner having air-cooled condensers or water-cooled condensers, heat pumps having air-cooled or water-cooled condensers and evaporators which operate in conjunction with expansion valves or capillary tubes, centrifugal chillers, water tower applications, ground grid or waste water applications or basically any system that uses a heat transfer cycle.

For example, an apparatus, when a refrigeration system is operating to provide a cooling effect, includes a subcooler having a heat exchanger disposed in a heat exchanging relationship with the input of the condenser and a precooler having another heat exchanger disposed in heat exchanging relationship with the output of the condenser. A working (cooling) fluid, such as water (or glycol or other for secondary heat exchange), is circulated through the heat exchanger of the subcooler and then through the heat exchanger of the precooler. Accordingly, the precooler and the subcooler function to precool the refrigerant flowing from the compressor into the condenser. Such precooling operates to reduce the temperature of the refrigerant until the refrigerant begins to change from its gaseous state to a liquid state. Upon entering the condenser, the refrigerant is further cooled by the condenser, and the great majority of the phase change of the refrigerant occurs. Upon being discharged from the condenser, the refrigerant may be subcooled to a lower temperature, substantially equal to the temperature of the water flowing into the subcooler, as far as energy efficiency calculations are concerned. Herein, the term substantially equal is used to recognize that the temperatures of the two different fluids may never be equal, but that the difference in temperature is insubstantial when calculating energy efficiency values, because the difference in temperature between one fluid and the other is not particularly relevant to energy efficiency, at least at the relevant portion of the cycle.

Because the refrigerant may be completely in a liquid state at the end of the relevant portion of the cycle, the subcooler operates to merely reduce the temperature of the refrigerant. It should be appreciated that the precooler and subcooler operate to primarily reduce the temperature of the refrigerant prior to entering and upon being discharged, respectively, from the condenser with the bulk of the phase change of the refrigerant occurring in the condenser itself. It should now be apparent that the flow rate of the water through the precooler and subcooler needed for maximum efficiency gain, for example, is substantially less than the flow rate of water in a conventional water-cooled condenser. Experience has shown that the precooler and subcooler, when used in conjunction with an air-cooled condenser, uses only ½oth of the mass of water required for a conventional water-cooled condenser, while capturing much of the benefit of a water-cooled condenser, as far as efficiency gain is concerned. For these reasons, the precooler and subcooler are able to produce as much as a net 30-96% or more increase in efficiency over existing air-cooled air conditioners or heat pumps, even in retrofits, while using a small fraction of the water needed for a water cooled system. Furthermore, the heat recovered from the water (or glycol or other for secondary heat exchange) working (cooling) fluid, can be utilized first for reuse by a potable hot water heating system or secondarily as a secondary heat supply.

For example, heat recovery from a working fluid may be 2.5 to 3.3 times as much as possible from a Desuperheater HRU. Typically when used on a 5 ton or 5 HP refrigeration system, 50 to 60 gallons of 50° F. rise heated water for each hour of system run time, may be produced. For electrical resistance heating elements operating at an efficiency of 0.92 and an electrical energy cost of $0.11/KWH, this would equate to a savings of approximately $0.87 per hour of Refrigeration run time, for an electric heat pump water heater with an efficiency of 2.2 and the same electric rate, the savings would be approximately $0.365 per hour of Refrigeration run time, for a natural gas water heater operating at an 80% efficiency and a natural gas rate of $0.90/therm, the savings would be approximately $0.28 per hour of Refrigeration run time. Assuming an annual need for hot water expressed in BTU's of (assuming a use of 200 gallons per day of 50° F. rise water) 30,295,000 BTU's output, the annual savings for an electric resistance water heater would be approximately $1,061.00 per year, for an Electric heat Pump water heater would be approximately $443.82 per year, for a 80% efficient natural gas water heater would be approximately $340.82 per year, and for an 80% efficient propane gas water heater at a propane fuel cost of $4.00 per therm the savings would be approximately $1,514.75 per year.

Additional features, combinations of features and advantages are disclosed within the detailed description of some examples s, as shown in the drawings and disclosure which follows. The examples are illustrative and do not limit the claims to the particular examples illustrated. Instead, the examples disclosed may be modified, combined and rearranged as would be understood by a person having ordinary skill in the art without straying from the intended scope of the language of claims that may eventually issue.

BRIEF DESCRIPTION OF THE DRAWINGS

The following drawings are illustrative examples and do not further limit any claims that may eventually issue.

When the same reference characters are used, these labels refer to similar parts in the examples illustrated in the drawings.

DETAILED DESCRIPTION

For purposes of the following discussion and the appended claims, the term "heat pump" shall be defined to include any type of apparatus capable of operating in a thermal transfer cycle to remove heat from an outdoor heat sink region and transfer that heat to an indoor heat sink region (heating mode of indoor region), or to remove heat from en indoor heat sink region and transfer that heat to an outdoor heat sink region (cooling mode of indoor region). Conventional cool or refrigeration units only operate one way, to remove heat from an indoor heat sink region and transfer that heat to an outdoor heat sink region.

Figure 1:
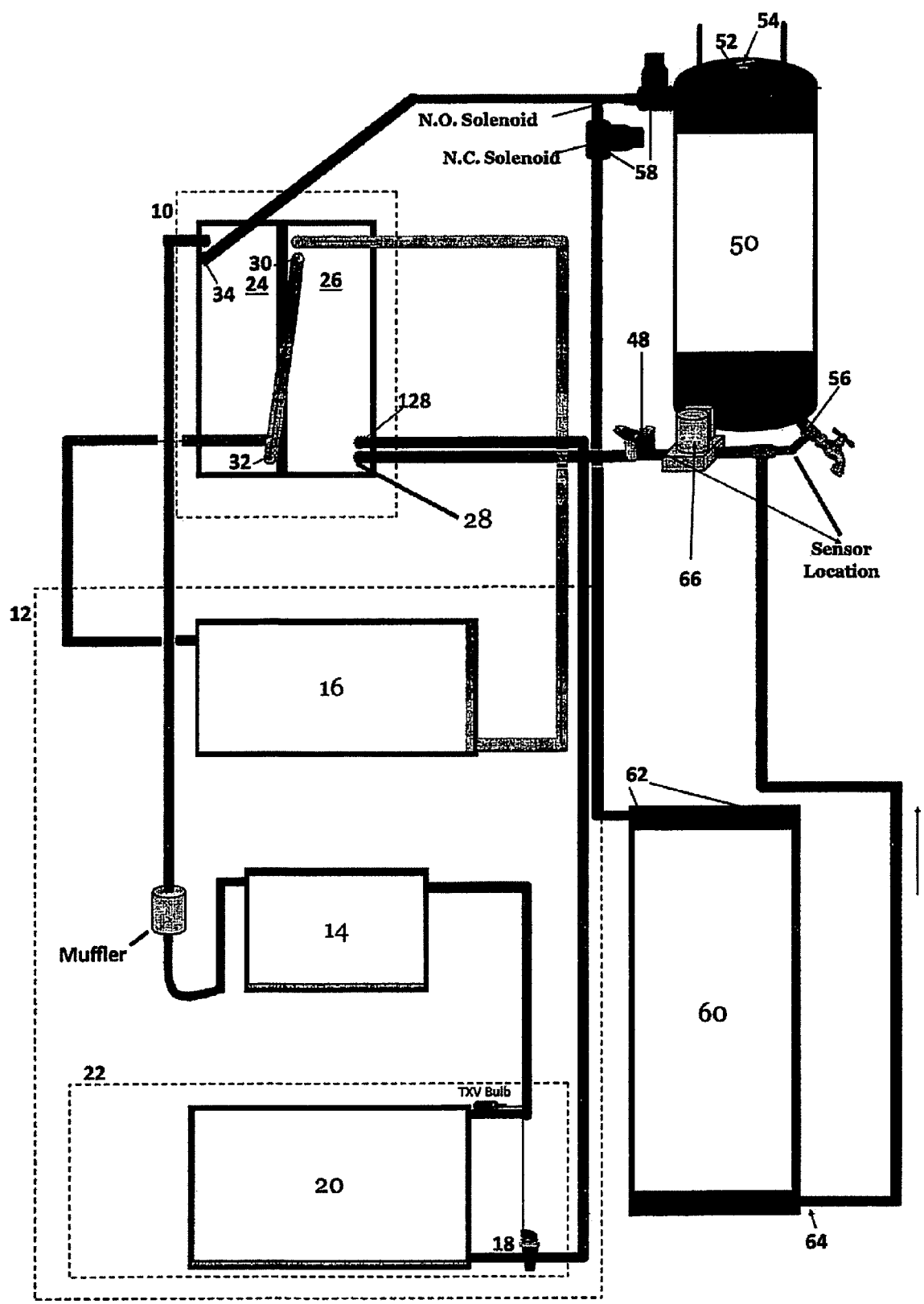
FIG. 1 is a schematic example of a precool/subcool heat recovery system.

FIG. 1 is a schematic example of a precool/subcool thermal recovery system 10 shown in a horizontal side by side configuration of the precool/subcool system 10 and a straight cool A/C or refrigeration unit (system) 12 operating to provide cooling to a conditioned space. The system 12 comprises a compressor 14, condenser 16, throttling device 18, and evaporator 20 connected in serial fluid communication with one another. The heat pump 12 is charged with a refrigerant which circulates through the system to remove heat from the evaporator 20 and transfer such heat along with the heat produced upon compression of the refrigerant by compressor 14 to the condenser 16. The evaporator 20 is disposed within an air handling unit generally indicated by the numeral 22, which circulates air about the evaporator 20 thereby cooling the air. It should be understood that the air handling unit 22 may alternatively comprise a fluid handling unit which circulates a fluid about the evaporator 20 thereby cooling the fluid (a so-called chilled fluid(chilled water) system, where the chilled water will be used in a secondary heat exchanger to provide cooling to an environment.

The precooler 24 is interconnected in fluid communication between the compress and condenser 16 thereby enabling the gaseous refrigerant to flow through. Similarly, the subcooler 26 is interconnected between condenser 16 and evaporator 20 enabling the condensed refrigerant to flow through. A fluid, such as water, is forced into subcooler 26 via input 28 to flow through in a heat exchanging relationship with the refrigerant being discharged from condenser 16. The water then exits through output 30 of the subcooler 26 and into input 32 of the precooler 24. The water flows in a heat exchanging relationship with the compressed refrigerant and is discharged from the premier 24 via output 34. Prom there, the heated water flows into the water Heater Storage tank 50 via a brass tee 52 that has been added to the water heater storage tank 50 between the P/T valve 54 and the storage tank. The cool water at the bottom of the tank is drawn by thermosyphonic action and/or pumped from the bottom outlet of the tank, where the tank drain is located, through a brass tee 56 installed between the boiler drain and the tank, and then flows back into the subcooler 26 via input 28 to start the cycle over again. Once the water outlet from the tank exceeds 90° F. as sensed by the thermostat 48, the solenoids 58 are activated and the hot water exiting from the output 30 of the precooler 28 to the input 62 of a secondary cooling system 60. Cooled water is the drawn from the output 64 of the secondary cooling system 60, and is pumped 66 to the input 28 of the subcooler 26.

Figure 1A:
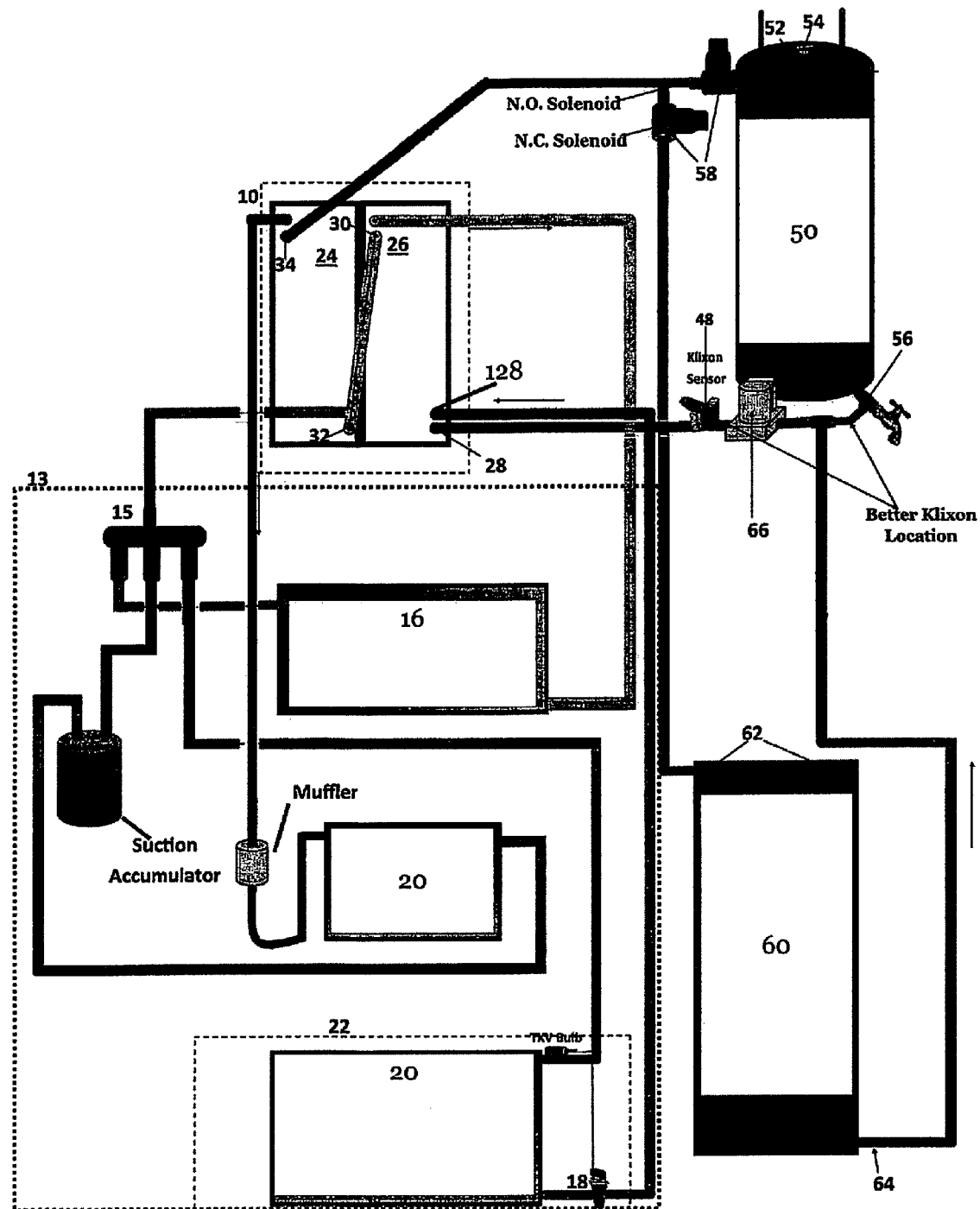
FIG. 1A is another schematic example of a precool/subcool thermal recovery system.

FIG. 1A is a schematic example of a horizontal side by side configuration of a precool/subcool system 10 and a heat pump thermal system 13 cooling a conditioned space (cooling mode) in the following example. A heat pump may be used to heat a conditioned space, as well. The heat pump system 13 comprises a compressor 14, condenser 16, throttling device 18, evaporator 20, and reversing valve 15 connected in serial fluid communication with one another. The heat pump 13 is charged with a refrigerant which circulates through the system to remove heat from the evaporator 20 and transfer such heat along with the heat produced upon compression of the refrigerant by compressor 14 to the condenser 16. The evaporator 20 is disposed within an air handling unit generally indicated by the numeral 22, which circulates air about the evaporator 20 thereby cooling the air. An air handling unit 22 may alternatively comprise a fluid handling unit which circulates a fluid about the evaporator 20 thereby cooling the fluid (a so-called chilled fluid (e.g. chilled water) system, where chilled water (as an example of a chilled fluid) may be used in a secondary heat exchanger to provide cooling to an environment.

The precooler 24 is interconnected in fluid communication between the compressor 14 and the reversing valve 15 and subsequently to the condenser 16 thereby enabling the gaseous refrigerant to flow through. Similarly, the subcooler 26 is interconnected between condenser 16 and evaporator 20 enabling the condensed refrigerant to flow through. A fluid, such as water, is forced into subcooler 26 via input 28 to flow through in a heat exchanging relationship with the refrigerant being discharged from condenser 16. The water then exits through output 30 of the subcooler 26 and into input 32 of the precooler 24. The water flows in a heat exchanging relationship with the compressed refrigerant and is discharged from the precooler 24 via output 34. From there, the heated water flows into the water Heater Storage tank 50 via a brass tee 52 that has been added to the water heater storage tank 50 between the P/T valve 54 and the storage tank. The cool water at the bottom of the tank is drawn by thermosyphonic action and/or pumped from the bottom outlet of the tank, where the tank drain is located, through a brass tee 56 installed between the boiler drain and the tank, and then flows back into the subcooler 26 via input 28 to start the cycle over again. Once the water outlet from the tank exceeds 90° F. as sensed by the thermostat 48, the solenoids 58 are activated and the hot water exiting from the output 30 of the precooler 28 is directed into the input 62 of the a secondary cooling system 60. Cooled water is then drawn from the output 64 of the secondary cooling system 60, and is pumped 66 to the input 28 of the subcooler 26.

Figure 1B:
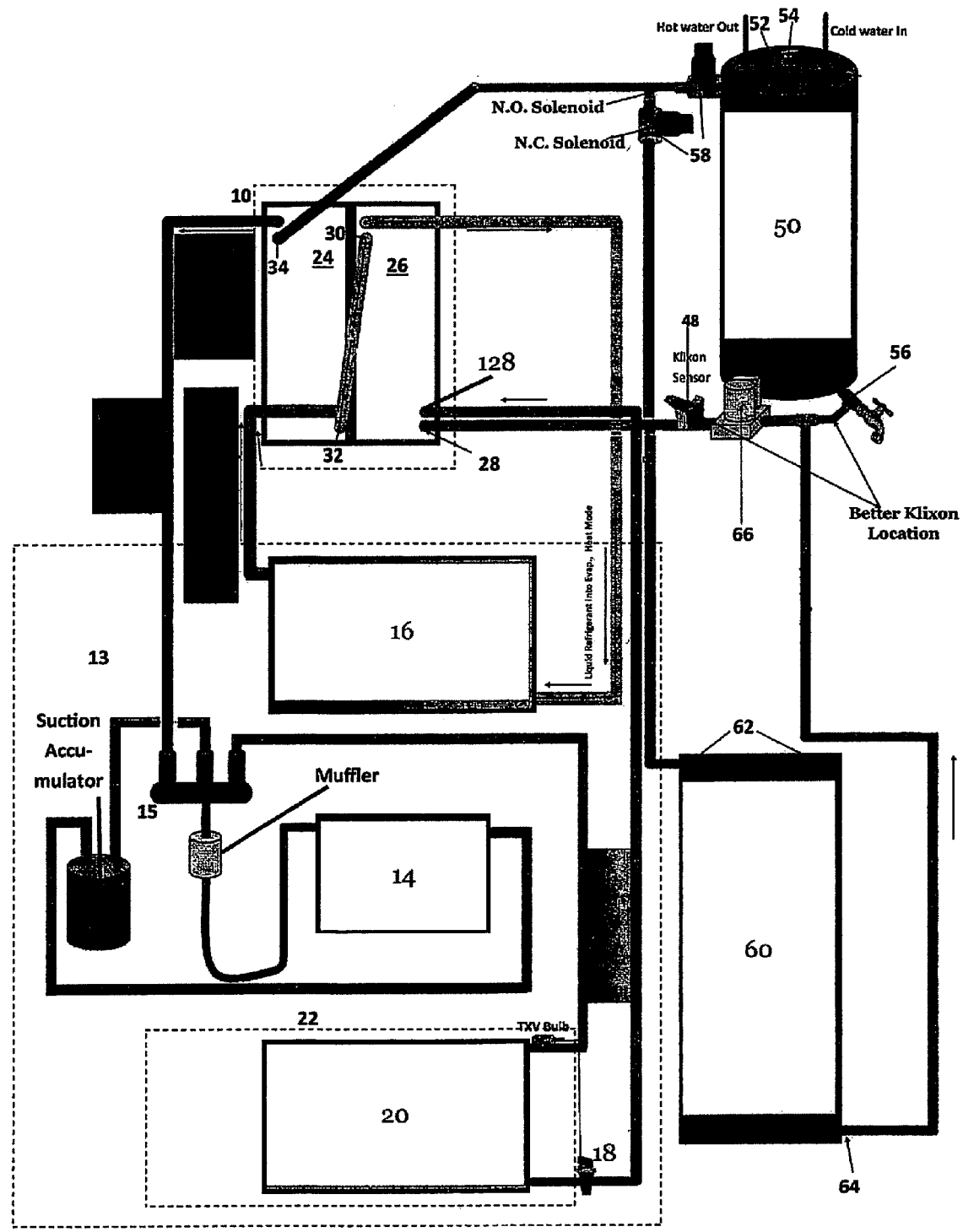
FIG. 1B is another schematic example of a precool/subcool heat recovery system.

FIG. 1B is a hardware schematic of the horizontal side by side configuration of the precool/subcool system 10 incorporated into a typical heat pump 13 operating to provide cooling to a conditioned space (cooling mode). Basically, the system 13 comprises a compressor 14, condenser 16, throttling device 18, evaporator 20, and reversing valve 15 connected in serial fluid communication with one another. The heat pump 13 is charged with a refrigerant which circulates through the system to remove heat from the evaporator 20 and transfer such heat along with the heat produced upon compression of the refrigerant by compressor 14 to the condenser 16. The evaporator 20 is disposed within an air handling unit generally indicated by the numeral 22, which circulates air about the evaporator 20 thereby cooling the air. It should be understood that the air handling unit 22 may alternatively comprise a fluid handling unit which circulates a fluid about the evaporator 20 thereby cooling the fluid (a so-called chilled fluid(chilled water) system, where the chilled water(Fluid) will be used in a secondary heat exchanger to provide cooling to an environment.

The precooler 24 is interconnected in fluid communication between the reversing valve 15 and the condenser 16 and thereby enabling the gaseous refrigerant to flow through. Similarly, the subcooler 26 is interconnected between condenser 16 and evaporator 20 enabling the condensed refrigerant to flow through. A fluid, such as water, is forced into subcooler 26 via input 28 to flow through in a heat exchanging relationship with the refrigerant being discharged from condenser 16. The water then exits through output 30 of the subcooler 26 and into input 32 of the precooler 24. The water flows in a heat exchanging relationship with the compressed refrigerant and is discharged from the precooler 24 via output 34. From there, the heated water flows into the water Heater Storage tank 50 via a brass tee 52 that has been added to the water heater storage tank 50 between the P/T valve 54 and the storage tank. The cool water at the bottom of the tank is drawn by thermosyphonic action and/or pumped from the bottom outlet of the tank, where the tank drain is located, through a brass tee 56 installed between the boiler drain and the tank, and then flows back into the subcooler 26 via input 28 to start the cycle over again. Once the water outlet from the tank exceeds 90° F. as sensed by the Klixon[1] thermostat 48, the solenoids 58 are activated and the hot water exiting from the output 30 of the precooler 28 is directed into the input 62 of the a secondary cooling system 60. Cooled water is then drawn from the output 64 of the secondary cooling system 60, and is pumped 66 to the input 28 of the subcooler 26.

[1]Klixon is a registered trademark of TEXAS INSTRUMENTS INCORPORATED.

Figure 1C:
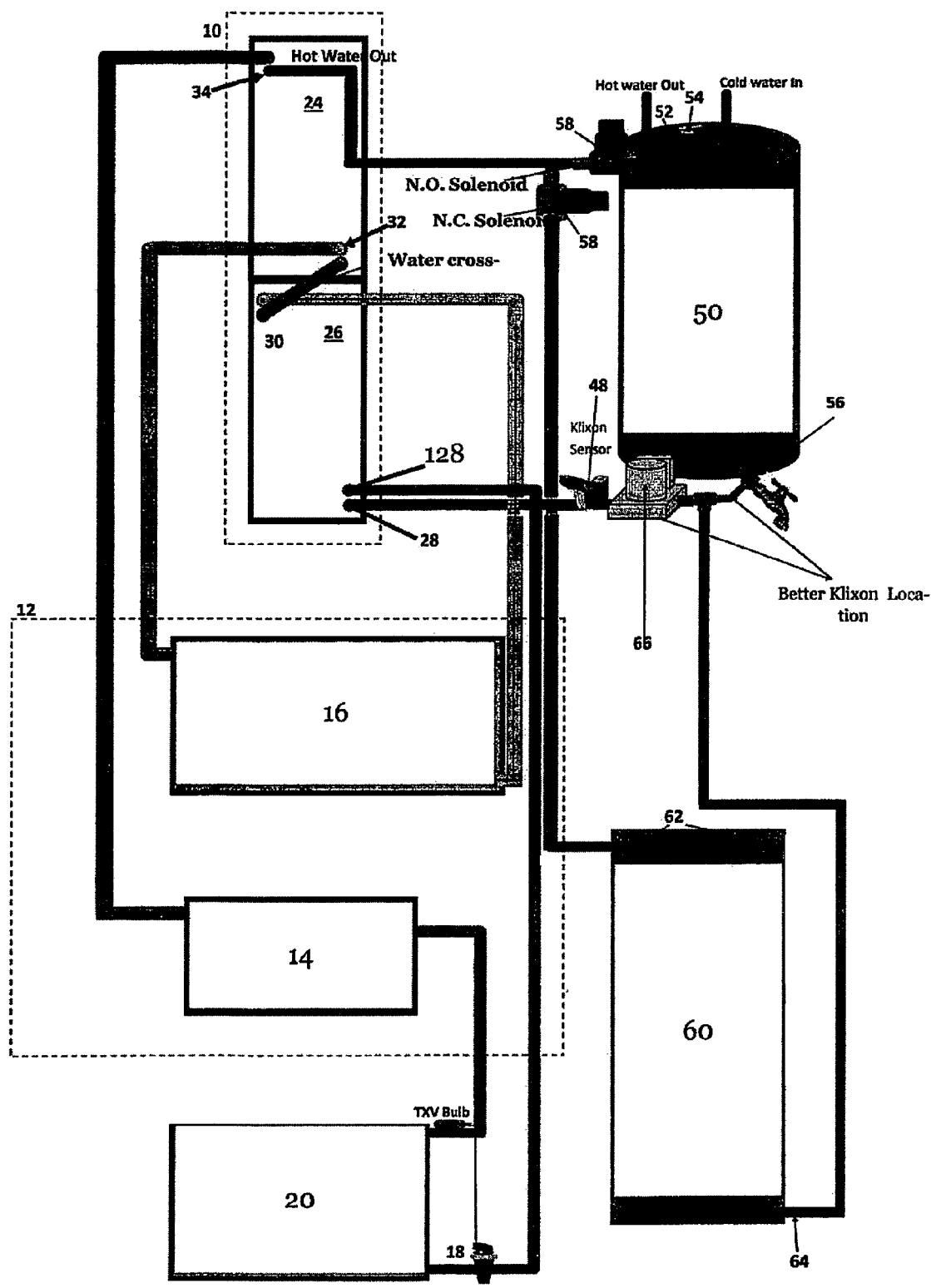
FIG. 1C is another schematic example of a precool/subcool heat recovery system.

FIG. 1C is a hardware schematic of the vertical over and under configuration of the precool/subcool system 10 incorporated into a typical straight cool A/C or refrigeration unit (system) 12 operating to provide cooling to a conditioned space. Basically, the system 12 comprises a compressor 14, condenser 16, throttling device 18, and evaporator 20 connected in serial fluid communication with one another. The heat pump 12 is charged with a refrigerant which circulates through the system to remove heat from the evaporator 20 and transfer such heat along with the heat produced upon compression of the refrigerant by compressor 14 to the condenser 16. The evaporator 20 is disposed within an air handling unit generally indicated by the numeral 22, which circulates air about the evaporator 20 thereby cooling the air.

It should be understood that the air handling unit 22 may alternatively comprise a fluid handling unit which circulates a fluid about the evaporator 20 thereby cooling the fluid (a so-called chilled fluid (chilled water) system, where the chilled water will be used in a secondary heat exchanger to provide cooling to an environment.

The precooler 24 is interconnected in fluid communication between the compressor 14 and condenser 16 thereby enabling the gaseous refrigerant to flow through. Similarly, the subcooler 26 is interconnected between condenser 16 and evaporator 20 enabling the condensed refrigerant to flow through. A fluid, such as water, is forced into subcooler 26 via input 28 to flow through in a heat exchanging relationship with the refrigerant being discharged from condenser 16. The water then exits through output 30 of the subcooler 26 and into input 32 of the precooler 24. The water flows in a heat exchanging relationship with the compressed refrigerant and is discharged from the precooler 24 via output 34. From there, the heated water flows into the water Heater Storage tank 50 via a brass tee 52 that has been added to the water heater storage tank 50 between the P/T valve 54 and the storage tank. The cool water at the bottom of the tank is drawn by thermosyphonic action and/or pumped from the bottom outlet of the tank, where the tank drain is located, through a brass tee 56 installed between the boiler drain and the tank, and then flows back into the subcooler 26 via input 28 to start the cycle over again. Once the water outlet from the tank exceeds 90° F. as sensed by the Klixon[2] thermostat 48, the solenoids 58 are activated and the hot water exiting from the output 30 of the precooler 28 to the input 62 of the secondary cooling system 60. Cooled water is the drawn from the output 64 of the secondary cooling system 60, and is pumped 66 to the input 28 of the subcooler 26.

[2]Klixon is a registered trademark of TEXAS INSTRUMENTS INCORPORATED.

Figure 1D:
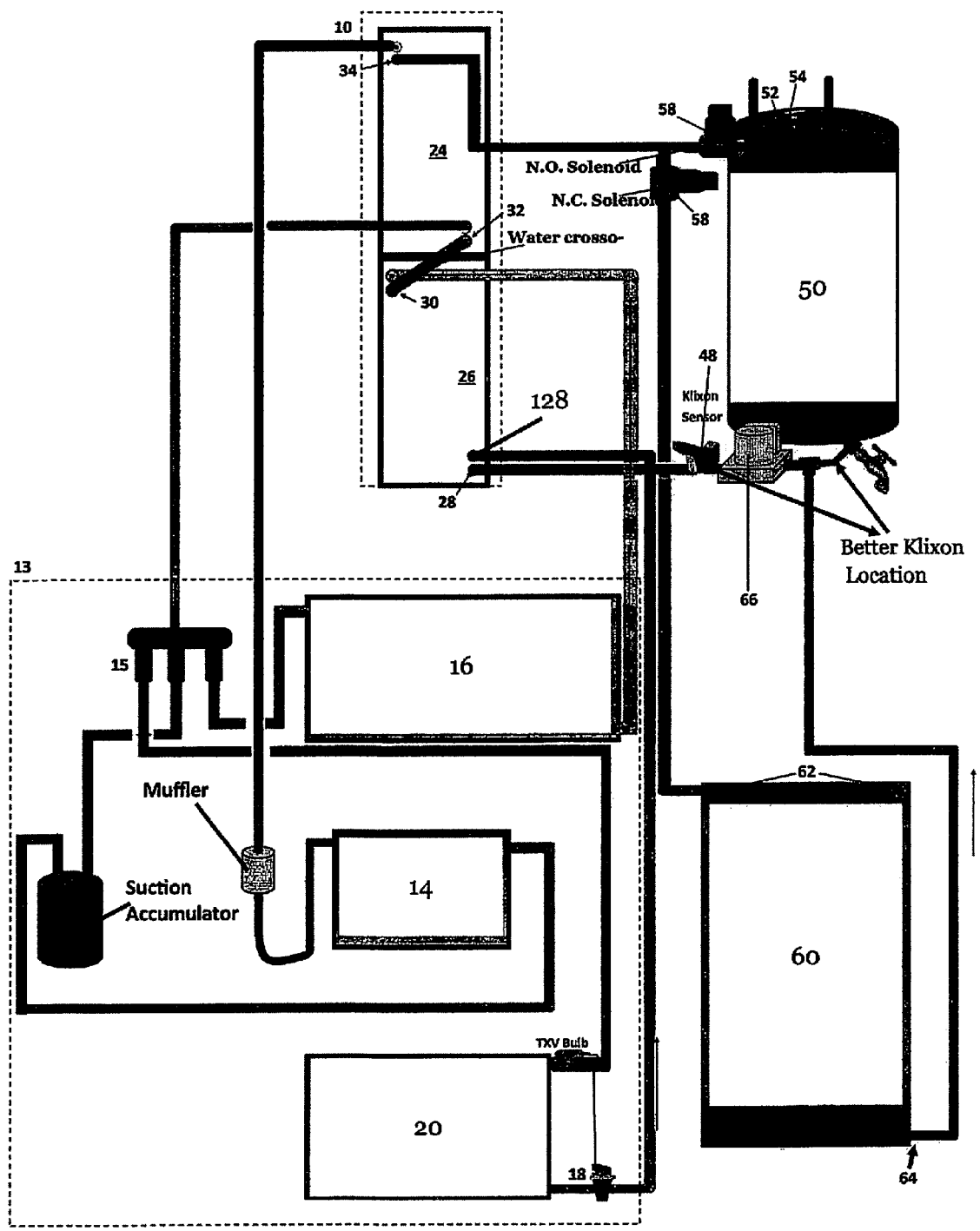
FIG. 1D is another schematic example of a precool/subcool heat recovery system.

FIG. 1D is a hardware schematic of the vertical over configuration of the precool/subcool system 10 incorporated into a typical heat pump 13 operating to provide cooling to a conditioned space (cooling mode). Basically, the system 13 comprises a compressor 14, condenser 16, throttling device 18, evaporator 20, and reversing valve 15 connected in serial fluid communication with one another. The heat pump 13 is charged with a refrigerant which circulates through the system to remove heat from the evaporator 20 and transfer such heat along with the heat produced upon compression of the refrigerant by compressor 14 to the condenser 16. The evaporator 20 is disposed within an air handling unit generally indicated by the numeral 22, which circulates air about the evaporator 20 thereby cooling the air. It should be understood that the air handling unit 22 may alternatively comprise a fluid handling unit which circulates a fluid about the evaporator 20 thereby cooling the fluid (a so-called chilled fluid(chilled water) system, where the chilled water (Fluid) will be used in a secondary heat exchanger to provide cooling to an environment.

The precooler 24 is interconnected in fluid communication between the compressor 14 and the reversing valve 15 and subsequently the condenser 16 thereby enabling the gaseous refrigerant to flow from one to the other. Similarly, the subcooler 26 is interconnected between condenser 16 and evaporator 20 enabling the condensed refrigerant to flow from one to the other. A fluid, such as water, is forced into subcooler 26 via input 28 to flow through in a heat exchanging relationship with the refrigerant being discharged from condenser 16. The water then exits through output 30 of the subcooler 26 and into input 32 of the precooler 24. The water flows in a heat exchanging relationship with the compressed refrigerant and is discharged from the precooler 24 via output 34. From there, the heated water flows into the water Heater Storage tank 50 via a brass tee 52 that has been added to the water heater storage tank 50 between the P/T valve 54 and the storage tank. The cool water at the bottom of the tank is drawn by thermosyphonic action and/or pumped from the bottom outlet of the tank, where the tank drain is located, through a brass tee 56 installed between the boiler drain and the tank, and then flows back into the subcooler 26 via input 28 to start the cycle over again. Once the water outlet from the tank exceeds 90° F. as sensed by the Klixon[3] thermostat 48, the solenoids 58 are activated and the hot water exiting from the output 30 of the precooler 28 is directed into the input 62 of the a secondary cooling system 60. Cooled water is then drawn from the output 64 of the secondary cooling system 60, and is pumped 66 to the input 28 of the subcooler 26.

[3]Klixon is a trademark of TEXAS INSTRUMENTS INCORPORATED

Figure 1E:
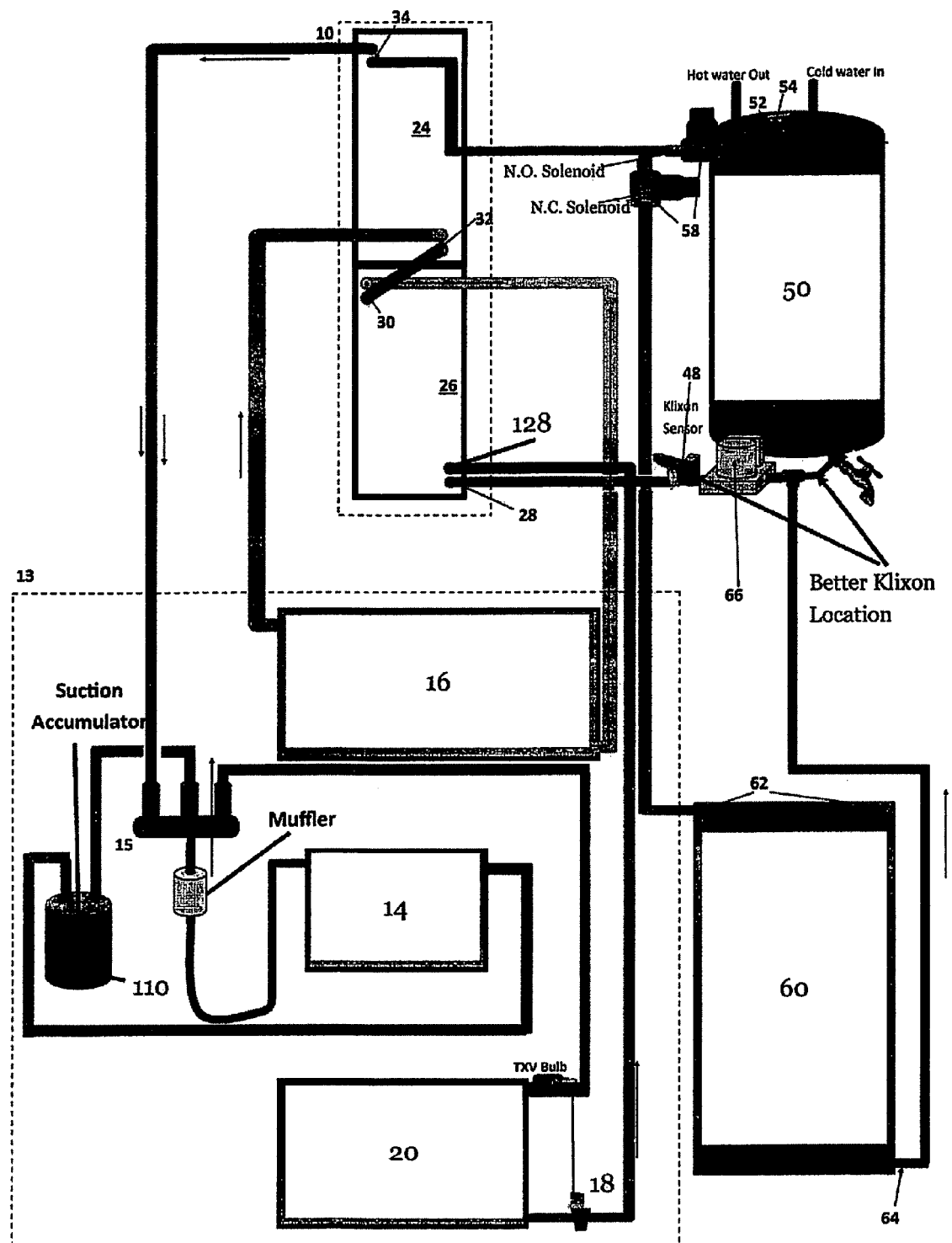
FIG. 1E is another schematic example of a precool/subcool heat recovery system.

FIG. 1E is a hardware schematic of the vertical over and under configuration of the precool/subcool system 10 incorporated into a typical heat hump 13 operating to provide cooling to a conditioned space cooling mode). Basically, the system 13 comprises a compressor 14, condenser 16, throttling device 18, evaporator 20, and reversing valve 15 connected in serial fluid communication with one another. The heat pump 13 is charged with a refrigerant which circulates through the system to remove heat from the evaporator 20 and transfer such heat along with the heat produced upon compression of the refrigerant by compressor 14 to the condenser 16. The evaporator 20 is disposed within an air handling unit generally indicated by the numeral 22, which circulates air about the evaporator 20 thereby cooling the air. It should be understood that the air handling unit 22 may alternatively comprise a fluid handling unit which circulates a fluid about the evaporator 20 thereby cooling the fluid (a so-called chilled fluid(chilled water) system, where the chilled water(Fluid) will be used in a secondary heat exchanger to provide cooling to an environment.

The precooler 24 is interconnected in fluid communication between the reverging valve 15 and the condenser 16, and thereby enabling the gaseous refrigerant to flow through. Similarly, the subcooler 26 is interconnected between condenser 16 and evaporator 20 enabling the condensed refrigerant to flow through. A fluid, such as water, is forced into subcooler 26 via input 28 to flow through in a heat exchanging relationship with the refrigerant being discharged from condenser 16. The water then exits through output 30 of the subcooler 26 and into input 32 of the precooler 24. The water flows in a heat exchanging relationship with the compressed refrigerant and is discharged from the precooler 24 via output 34. From there, the heated water flows into the water Heater Storage tank 50 via a brass tee 52 that has been added to the water heater storage tank 50 between the P/T valve 54 and the storage tank. The cool water at the bottom of the tank is drawn by thermosyphonic action and/or pumped from the bottom outlet of the tank, where the tank drain is located, through a brass tee 56 installed between the boiler drain and the tank, and then flows back into the subcooler 26 via input 28 to start the cycle over again. Once the water outlet from the tank exceeds 90° F. as sensed by the thermostat 48, the solenoids 58 are activated and the hot water exiting from the output 30 of the precooler 28 is directed into the input 62 of the a secondary cooling system 60. Cooled water is then drawn from the output 64 of the secondary cooling system 60, and is pumped 66 to the input 28 of the subcooler 26.

Figure 2A:
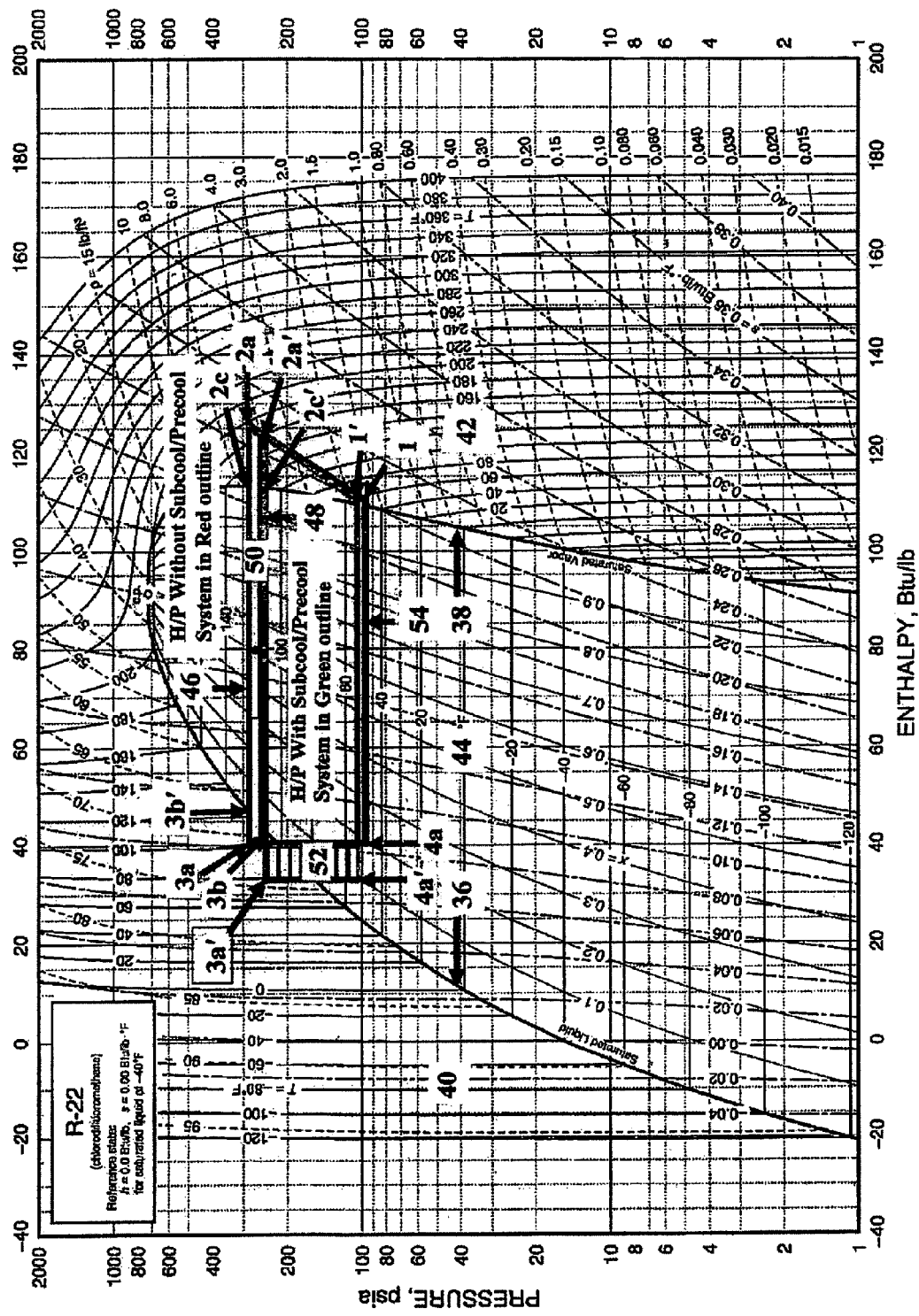
FIG. 2a is an exemplary representation of a process of the system illustrated in FIGS. 1, 1A, 1B (cool Mode), 1C, 1D, 1E (cool mode).

FIG. 2A is a process representation of a typical R-22 heat pump 12 having the precool/subcool system 10 incorporated therein, operating in the cooling mode of the indoor environment More particularly, the process representation is represented by a pressure-enthalpy diagram which illustrates the particular thermodynamic characteristics of a typical refrigerant(R-22). The diagram illustrates a vapor dome of the refrigerant defined by a saturated-liquid line 36 and a saturated-vapor line 38. The area represented by numeral 40 to the left of the saturated-liquid line 36 is commonly referred to as the subcooling region and the area 42 to the right of the saturated-vapor line 38 is commonly called the super-heated-vapor region. Finally, the area represented by the numeral 44 contained within the vapor dome between the saturated-liquid line 36 and the saturated-vapor line 38, is commonly called the mixed-phase region.

In a refrigeration cycle of a heat pump 12, a compressor 14 compresses a refrigerant from a saturated-vapor state represented by point 1 on the diagram to a superheated-vapor state represented by point 2a thereby increasing the temperature, enthalpy and pressure of the refrigerant. The refrigerant then flows through the condenser 16 wherein the enthalpy of the refrigerant is reduced at a constant pressure thereby causing the refrigerant to change from a super-heated-vapor state to a saturated-liquid state, represented by point 3a of the diagram. The refrigerant flows through a throttling device 18 which reduces the pressure of the refrigerant at constant enthalpy to a mixed-phase state represented by point 4a. The refrigerant then flows through the evaporator 20 which increases the enthalpy of the refrigerant at a constant pressure until the refrigerant is again in a saturated-vapor state represented by point 1 on the diagram. In actual practice, it is well known that the compressor 14 compresses the refrigerant to a higher super-heated-vapor region represented by point 2a on the diagram. The refrigerant then flows through the condenser 16 along line 46 until the refrigerant is in a saturated-liquid state. It is noted that line 46 gradually slopes from point 2a to point 3a.

When a precool/subcool system 10 is incorporated in a heat pump system 12, then upon being compressed by compressor 14 to a superheated-vapor state represented by point 2b, the water flowing into the input 32 of the precooler 24 causes the temperature of the refrigerant to be more rapidly decreased, as represented by line 48. Such precooling causes the refrigerant to be reduced from its super-heated-vapor state to at least a saturated-vapor state represented by point 2c. It is noted that by increasing the flow rate of the water through the precooler 24, the precooler 24 can further decrease the temperature of the refrigerant thereby causing the refrigerant to change from its superheated-vapor state to a mixed-phase state composed primarily of vapor. Accordingly, the shaded area 50 between line 46 and 48 illustrates the magnitude of the increased efficiency of the heat pump 12 having such a precooler 24 incorporated therein, according to one example.

A subcooler 26 may operate to subcool a refrigerant being discharged from the condenser 16 thereby causing the refrigerant to change from a saturated-liquid state represented by point 3b on the diagram to a subcooled state represented by point 3c. The refrigerant then flows through the throttling device 18 which causes the refrigerant to change from a subcooled state to a mixed-phase state, represented by point 4b on the diagram. Accordingly, the shaded area 52 on the diagram illustrates the increased efficiency of the heat pump 12 having the subcooler 26 incorporated therein. The degree of subcooling is dependent upon the flow rate of the water through the input 28 of the subcooler 26 and the temperature of the cooling fluid. When the condenser 16 of the heat pump 12 is exposed to elevated outside temperatures, the condenser 16 may only condense the refrigerant to a mixed-phase state composed primarily of liquid, represented by point 3B. When this occurs, the subcooler 26 cools the refrigerant to assure that the refrigerant changes to at least a saturated-liquid state or further to a subcooled state. The size of the shaded area 52 representing the increased efficiency of the heat pump 12 is therefore greatly increased.

It should be appreciated that the precooler 24 and the subcooler 26 reduces the temperature of the refrigerant as the refrigerant passes through, with the bulk of the phase change of the refrigerant being accomplished by the condenser 16. Accordingly, the flow rate of the water circulated through the subcooler 26 and the precooler 24 needed for maximum efficiency of the refrigeration cycle is greatly reduced from that amount of water needed for a straight water-cooled condenser. Such a reduction in required flow rate of water can be best illustrated by way of example.

Calculations based upon a three ton heat pump 12 charged with R-22 refrigerant and having a precool/subcool system incorporated within it according to one example, are shown below. The calculations are provided for illustrating the relatively low flow rate of the water through the precooler 24 and the subcooler 26 and the resulting substantial increase in the energy efficiency ratio (E.E.R.) of the heat pump 12. The following are well recognized definitions:

$C_{P,S}$=heat capacity of gaseous refrigerant (R-22)=0.01 (Btu/lb/° F.) for gas in range of 104.degree. to 148° F.; $C_{p,L}$=heat capacity of liquid refrigerant (R-22)=0.31 (Btu/lb/° F.) for liquid in range of 72.degree. to 102° F.; $C_{p,w}$=heat capacity of water=1.0 (Btu/lb/° F.); W=weight of refrigerant circulated per ton=200/R.E. (lb/Min/ton; R.E.=refrigerating effect=ΔH=enthalpy (H) of saturated vapor in the evaporator (dependent on temperature of evaporator) minus enthalpy (H) of liquid ahead of throttling device (dependent on temperature of liquid refrigerant); $M_R$=Mass flow rate of refrigerant=W.times.# of tons (lb/min); $M_W$=Mass flow rate of water (lb/min); $\Delta T_L$=Change in liquid refrigerant temperature; $\Delta T_L$=Change in liquid refrigerant temperature; $\Delta T_S$=Change in gaseous refrigerant temperature; $\Delta T_W$=Change in water temperature.

The flow rate of the water through the subcooler 26 when the evaporator temperature is equal to 40.degrees. F. and the liquid temperature is 72.degrees. F. is computed as follows: Enthalpy (H) of evaporator temperature at 40.degree. F.=108.142 (Btu/lb); Enthalpy of liquid refrigerant at 72° F.=30.712; W=2.9483 Lb/Min/ton; R.E.=ΔH=108.142−30.712=77.43 (Btu/lb); $M_R$=W.times.3 tons=8.845 lb/min; $\Delta T_L$=33.degree. F. ##EQUI##; $C_{p,L}$=0.31 (Btu/lb)/° F.

The temperature of the water flowing into and being discharged from the subcooler is measured to be 72.degree. F. and 102.degree. F., respectively. Accordingly, $\Delta_{TW}$=30.degrees. $c_{p,w}$=1 (Btu/lb/° F.). By definition, $c_{p,L} X \cdot_{MR} \cdot X \cdot \Delta_{TR} = c_{p,w} \cdot X \cdot_{MW} \times \Delta_{TW}$. Solving for $M_W = (c_{p,L} \cdot X \cdot_M R \times \Delta_{TW}) / (c_{p,w} \times \Delta_{TW})$=032 Gal/$mi_n$. Or determining the flow rate of the water required per ton, $M_w$/ton=(0.32 Gal/Min)/3 tons=0.1 GPM/ton. The flow rate of the water through the precooler 24 when the condenser gaseous temperature is equal to 220.degree. F. and the liquid temperature is 105.degree. F. is computed as follows: $\Delta_{Tg}$=115° F. $c_{p,g}$=0.01 (Btu/lb/° F.). The temperature of the water flowing into and being discharged from the precooler is measured to be 102.degree. F. and 132.degree. F., respectively. Accordingly, $\Delta_{Tw}$=30° F. $c_{p,w}$=1 (Btu/lb/° F.). By definition, $c_{p,g} X_{MR} X . \Delta_{TR} = c_{p,w} X M w X \Delta_{Tw}$. Solving for Mw, Mw=$(c_{p,S} X_{MR} X . \Delta_{TR})/(c_{p,w} X M w X \Delta_{Tw})$=0.04 Gal/Min, where 1 Gal of water=8.3 lb. Or, determining the flow rate of the water required per ton, $M_w$=0.04 Gal/Min/3 tons=0.0133 GPM/ton. It should be appreciated that the flow rate of the water through the subcooler equals 0.1 gal/min per ton whereas the flow rate through the precooler equals 0.0133 gal/min per ton. This should Abe compared to the 3 gal/min per ton recommended for a straight water-cooled condenser. According to the example, an Energy Efficiency Ratio (E.E.R.) of a heat pump 12 having the precool/subcool system 10 retrofit is substantially, based on the following data and calculations of a heat pump 12 with and without a precooler/subcooler thermal efficiency system.

The following are well recognized definitions: E.E.R.= (capacity in Btuh produced by heat pump)/watts of electrical power input=capacity in BTUH produced/VXAXP.F., where V=volts; A=amperes(current); P.F.=power factor (assume to be 0.85); and, q=4.5 X (CFM) X$\Delta$H (of air passing through evaporator/air handler; where, CFM=cubic feet of air per minute passing through evaporator, $\Delta$H=change of enthalpy of air passing through evaporator WB=Wet bulb temperature DB=Dry bulb temperature.

The actual measurements are tabulated as follows:

| Description | w/out thermal efficiency system | with thermal efficiency system |
|---|---|---|
| total air volume (CFM) | 800 | 800 |
| Amperage draw | 21.0 | 17.0 |
| head pressure (psig) | 260 | 215 |
| voltage | 220 | 220 |
| Condenser entering (° F.) | 70 DB | 70 DB |
| air temperature (° F.) entering evaporator | 75 DB/68 WB | 75 DB/68 WB |
| Air temperature (° F.) Exiting Evaporator | 59 DB/55 WB | 54 DB/50 WB |

The enthalpy of the air flow through the evaporator is determined by the thermodynamic properties of air as shown on a standard air Psychometric chart. With standard air, the enthalpy of the air at 75.degree. DB & 68.degree. F. WB, 59.degree. DB & 55.degree. F. WB, and 54.degree. DB & 50.degree. F. WB, is equal to 32.4, 242, and 20.2 (Btu/lb), respectively. Solving for the E.E.R. of a heat pump 12 with and without a thermal efficiency system retrofitted thereto reveals the following: Q(capacity) without a thermal efficiency system=CFMX4.5X$\Delta$H=800 ZX4.5X (32.4−34.2)= 29,250 Btu. Power without a thermal efficiency system=21X220X85=3,927 watts. EER without a thermal efficiency system=29,250 Btuh/3,927 watts 7.45. Q(capacity) with a thermal efficiency system=CFMX4.5X$\Delta$H=800 ZX4.5X (32.4−20.2)=43,920 Btu. Power with a thermal efficiency system=17.01X220X.85=3179 watts. EER. with a thermal efficiency system=43,920 Btuh/3179 watts=13.82. With an E.E.R.=7.45 (without thermal efficiency system) and an E.E.R.=13.82 (with a thermal efficiency system). According to this example, an 84% increase in efficiency is obtained, and a 50.2% increase in capacity is provided by the addition of the thermal efficiency system retrofit to a heat pump.

Figure 2B:
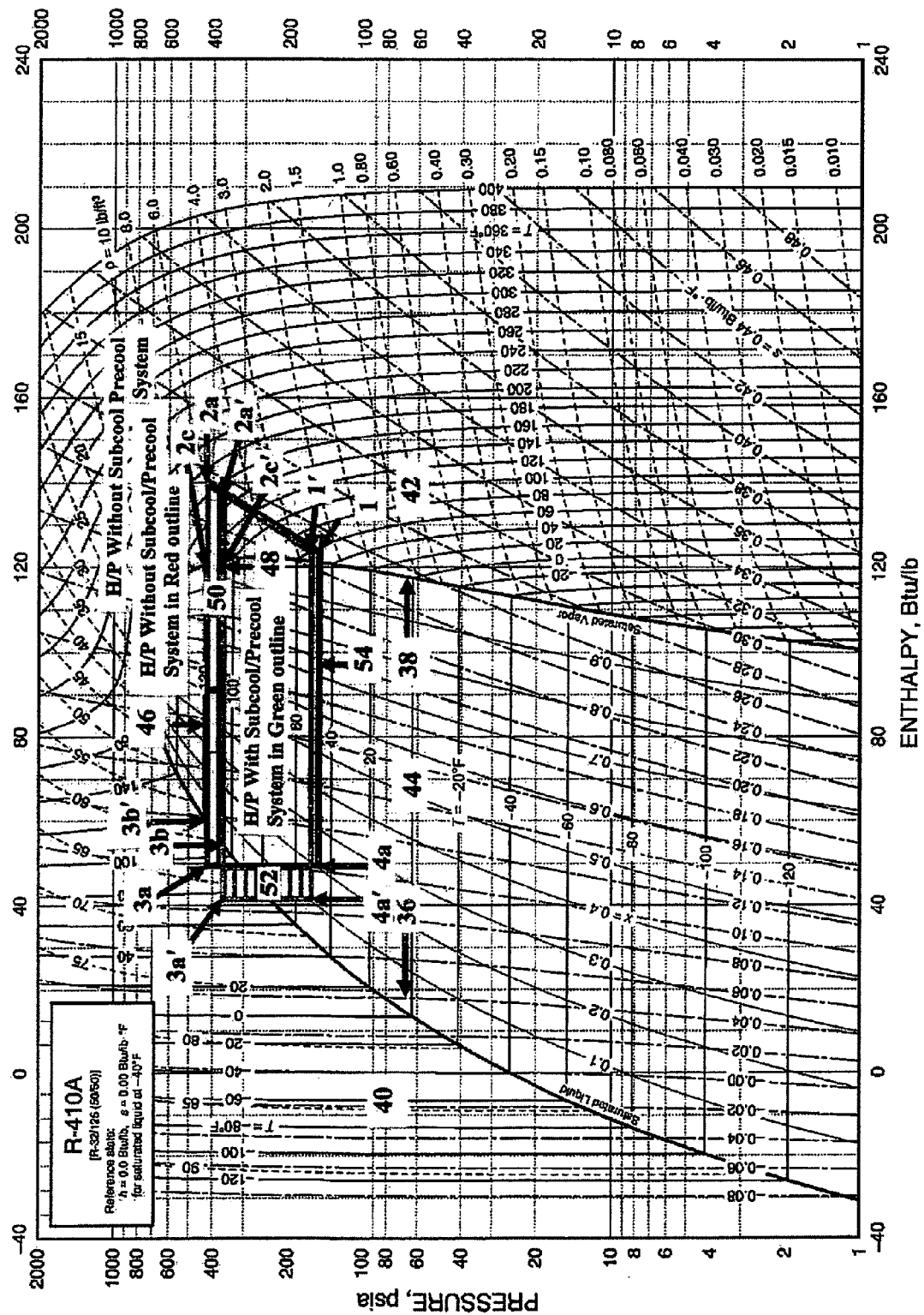
FIG. 2b is a process representation of the heat pump illustrated in FIGS. 1, 1A, 1B (cool Mode), 1C, 1D, 1E (cool mode) for an R-410A system (other refrigerants similar).

FIG. 2B is a process representation of a R410A heat pump 12 having the precool/subcool system 10 incorporated therein, operating in the cooling mode of the indoor environment. More particularly, the process representation is represented by a pressure-enthalpy diagram which illustrates the particular thermodynamic characteristics of a typical refrigerant (R-410A). The diagram illustrates a vapor dome of the refrigerant defined by a saturated-liquid line 36 and a saturated-vapor line 38. The area represented by numeral 40 to the left of the saturated-liquid line 36 is commonly referred to as the subcooling region and the area 42 to the right of the saturated-vapor line 38 is commonly called the super heated-vapor region. Finally, the area represented by the numeral 44 contained within the vapor dome between the saturated-liquid line 36 and the saturated-vapor line 38, is commonly called the mixed-phase region.

A refrigeration cycle of a heat pump 12 includes a compressor. The compressor 14 compresses a refrigerant from a saturated-vapor state represented by point 1 on the diagram to a superheated-vapor state represented by point 2a thereby increasing the temperature, enthalpy and pressure of the refrigerant. The refrigerant then flows through the condenser 16 wherein the enthalpy of the refrigerant is reduced at a constant pressure thereby causing the refrigerant to change from a superheated-vapor state to a saturated-liquid state, represented by point 3a of the diagram. The refrigerant flows through a throttling device 18 which reduces the pressure of the refrigerant at constant enthalpy to a mixed-phase state represented by point 4a. The refrigerant then flows through the evaporator 20 which increases the enthalpy of the refrigerant at a constant pressure until the refrigerant is again in a saturated-vapor state represented by point 1 on the diagram. In actual practice, it is well known that the compressor 14 compresses the refrigerant to a higher superheated-vapor region represented by point 2a on the diagram. The refrigerant then flows through the condenser 16 along liter 46 until the refrigerant is in a saturated-liquid state. It is noted that line 46 gradually slopes from point 2a to point 3a.

The refrigeration cycle of the heat pump 12 having the precool/subcool system 10 incorporated therein is described as follows. Upon being compressed by compressor 14 to a superheated-vapor state represented by point 2b, the water flowing into the input 32 of the precooler 24 causes the temperature of the refrigerant to be more rapidly decreased, as represented by line 48. Such precooling causes the refrigerant to be reduced from its superheated-vapor state to at least a saturated-vapor state represented by point 2c. It is noted that by increasing the flow rate of the water through the precooler 24, the precooler 24 can further decrease the temperature of the refrigerant thereby causing the refrigerant to change from its superheated-vapor state to a mixed-phase state composed primarily of vapor. Accordingly, the shaded area 50 between line 46 and 48 illustrates the magnitude of the increased efficiency of the heat pump 12 having the precooler 24 incorporated therein.

The subcooler 26 operates to subcool the refrigerant being discharged from the condenser 16 thereby causing the refrigerant to change from a saturated-liquid state represented by point 3b on the diagram to a subcooled state represented by point 3c. The refrigerant then flows through the throttling device 18 which causes the refrigerant to change from a subcooled state to a mixed-phase state, represented by point 4b on the diagram. Accordingly, the shaded area 52 on the diagram illustrates the increased efficiency of the heat pump 12 having the subcooler 26 incorporated therein. The degree of subcooling is dependent upon the flow rate of the water through the input 28 of the subcooler 26 and the temperature of the cooling fluid. When the condenser 16 of the heat pump 12 is exposed to elevated outside temperatures, the condenser 16 may only condense the refrigerant to a mixed-phase state composed primarily of liquid, represented by point 3B. When this occurs, the subcooler 26 cools the refrigerant to assure that the refrigerant changes to at least a saturated-liquid state or further to a subcooled state. The size of the shaded area 52 representing the increased efficiency of the heat pump 12 is therefore greatly increased.

It should be appreciated that the precooler 24 and the subcooler 26 reduces the temperature of the refrigerant as the refrigerant passes through, with the bulk of the phase change of the refrigerant being accomplished by the condenser 16. Accordingly, the flow rate of the water circulated through the subcooler 26 and the precooler 24 needed for maximum efficiency of the refrigeration cycle is greatly reduced from that amount of water needed for a straight water-cooled condenser. An example for R-41-0A (or any other refrigerant) would have slightly different but very similar results as seen for the R-22 system as shown in the example given in FIG. 2A detailed description above.

Figure 3A:
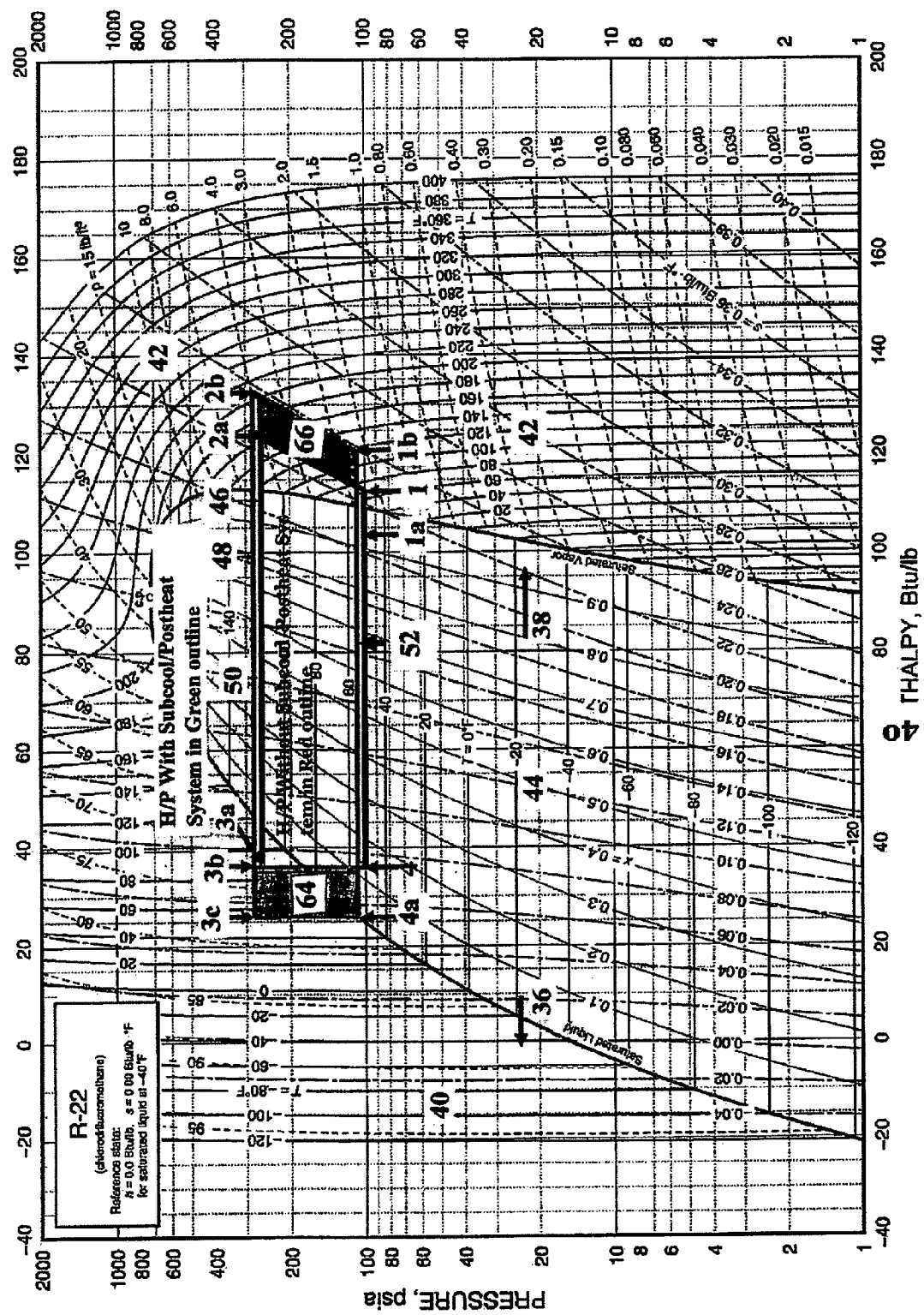
FIG. 3a is a process representation of the heat pump illustrated in FIGS. 1B (Heat Mode), 1E (Heat mode) for an R-22 system (other refrigerants similar).

FIG. 3A is a process representation of a typical R-22 heat pump 13 having the postheat/subcool system 10 incorporated therein, operating in the heating anode of the indoor environment. More particularly, the process representation is represented by a pressure-enthalpy diagram which illustrates the particular thermodynamic characteristics of a typical refrigerant (R-22). The diagram illustrates a vapor dome of the refrigerant defined by a saturated-liquid line 36 and a saturated-vapor line 38. The area represented by numeral 40 to the left of the saturated-liquid line 36 is commonly referred to as the subcooling region and the area 42 to the right of the saturated-vapor line 38 is commonly called the super heated-vapor region. Finally, the area represented by the numeral 44 contained within the vapor dome between the saturated-liquid line 36 and the saturated-vapor line 38, is commonly called the mixed-phase region.

A refrigeration cycle of a heat pump 13 includes a compressor 14 that compresses a refrigerant from a saturated-vapor state represented by point 1 on the diagram to a superheated-vapor state represented by point 2a thereby increasing the temperature, enthalpy and pressure of the refrigerant. The refrigerant then flows through the condenser 16 wherein the enthalpy of the refrigerant is reduced at a constant pressure thereby causing the refrigerant to change from a superheated-vapor state to a saturated-liquid state, represented by point 3a of the diagram. The refrigerant flows through a throttling device 18 which reduces the pressure of the refrigerant at constant enthalpy to a mixed-phase state represented by point 4a. The refrigerant then flows through the evaporator 20 which increases the enthalpy of the refrigerant at a constant pressure until the refrigerant is again in a saturated-vapor state represented by point 1 on the diagram. In actual practice, it is well known that the compressor 14 compresses the refrigerant to a higher superheated-vapor region represented by point 2a on the diagram. The refrigerant then flows through the condenser 16 along line 46 until the refrigerant is in a saturated-liquid state. It is noted that line 46 gradually slopes from point 2a to point 3a.

In the heating mode, the refrigeration cycle of the heat pump 12 having the (now) postheat/subcool system 10 incorporated therein is described as follows. After the refrigerant is post heated by the fluid passing through the post heater from point 1 to point 1b it is compressed by compressor 14 to a superheated-vapor state represented by point 2b, the water flowing into the input 32 of the (now) post heater 24 causes the temperature of the refrigerant to be increased, as represented by line 48. Such postheating causes the refrigerant to be increased from its unmodified superheated-vapor state to a higher superheated-vapor state represented by point 1b. It is noted that by increasing the flow rate of the water through the (now) postheater 24, the postheater 24 can further increase the superheated temperature of the refrigerant thereby causing the refrigerant at the compressed superheated state to increase in temperature and pressure. Accordingly, the shaded area 50 between line 46 and 48 and shaded area 66 between line from 1 to 2a and line between 1b and 2b as well as the shaded area 52 between line from point 1 to point 4 and line from point 1b to point 4a illustrates the magnitude of the increased efficiency of the heat pump 12 having the postheater 24 and subcooler 26 incorporated therein.

The subcooler 26 operates to subcool the refrigerant being discharged from the condenser 16 thereby causing the refrigerant to change from a saturated-liquid state represented by point 3b on the diagram to a subcooled state represented by point 3c. The refrigerant then flows through the throttling device 18 which causes the refrigerant to change from a subcooled state to a mixed-phase state, represented by point 4a on the diagram. Accordingly, the shaded area 64 on the diagram illustrates the increased efficiency of the heat pump 12 having the subcooler 26 incorporated therein. The degree of subcooling is dependent upon the flow rate of the water through the input 28 of the subcooler 26 and the temperature of the cooling fluid. The heat that is absorbed from the liquid refrigerant is reintroduced to the refrigerant in the postheater 24 with results as described in the previous paragraph. When the evaporator (outdoor coil in heat mode) 20 of the heat pump 12 is exposed to low outside temperatures, the evaporator 20 may only evaporate the refrigerant to a mixed-phase state composed primarily of liquid, represented by point 1a. When this occurs, the postheater 24 warm the refrigerant to assure that the refrigerant changes to at least a saturated-vapor state or further to a superheated state. The size of the shaded areas 52, 66, & 50 representing the increased efficiency of the heat pump 12 in the heating mode is therefore greatly increased.

It should be appreciated that the postheater 24 and the subcooler 26 result in an increase of the temperature of the refrigerant as the refrigerant passes through, with the bulk of the phase change of the refrigerant being accomplished by the evaporator 20. Accordingly, the flow rate of the water circulated through the subcooler 26 and the postheater 24 especially with the reclaim of heat from the liquid refrigerant to the evaporating/superheating refrigerant needed for maximum efficiency of the refrigeration cycle is greatly reduced from that amount of water needed for a standard straight (water source) water-heated evaporator.

Figure 3B:
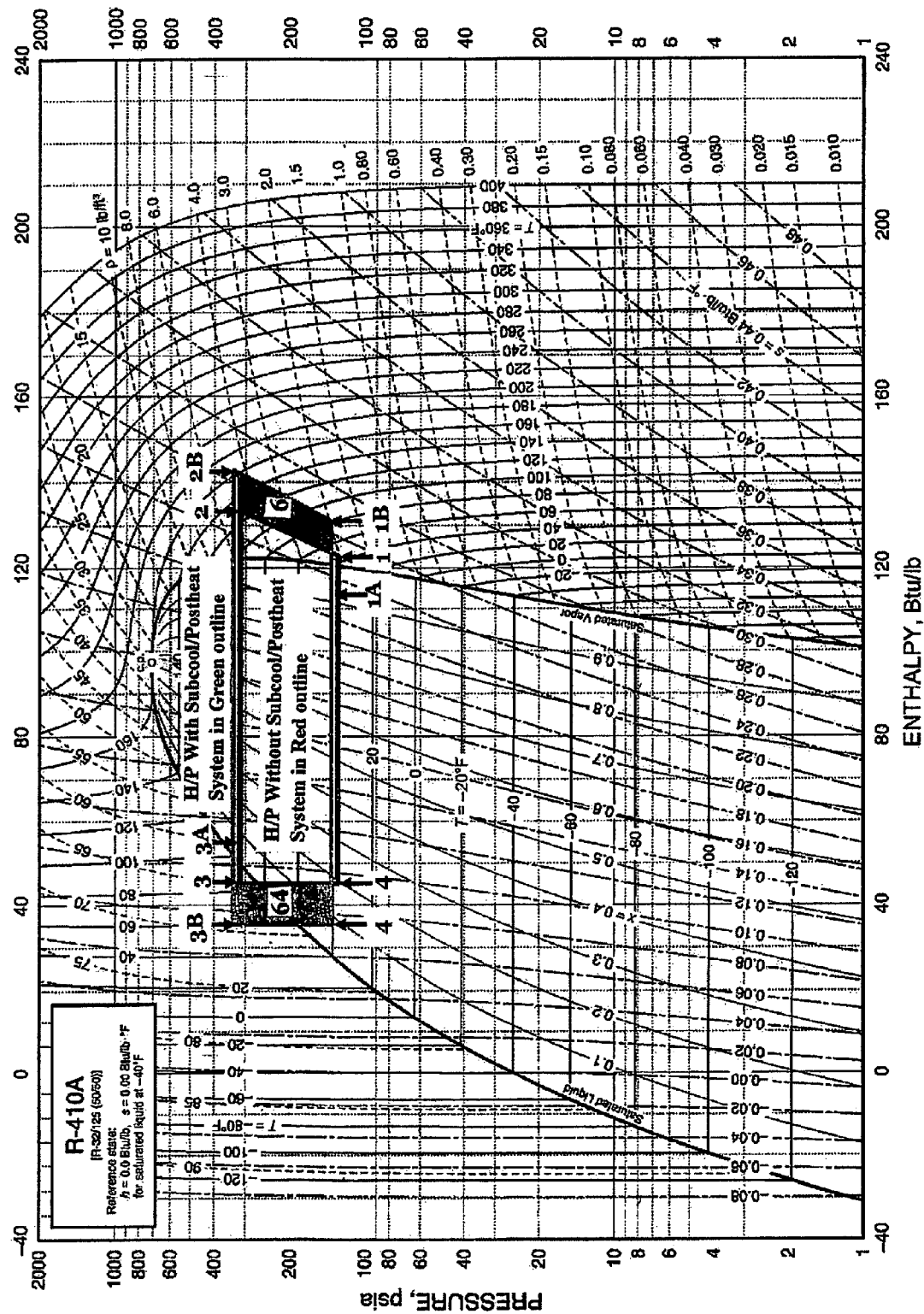
FIG. 3b is a process representation of the heat pump illustrated in FIGS. 1B (Heat Mode) 1E (Heat mode) for an R-410A system (other refrigerants similar).

FIG. 3b is a process representation of a typical R-410a heat pump 13 having the postheat/subcool system 10 incorporated therein, operating in the heating mode of the indoor environment. More particularly, the process representation is represented by a pressure-enthalpy diagram which illustrates the particular thermodynamic characteristics of a typical refrigerant (R-410a). The diagram illustrates a vapor dome of the refrigerant defined by a saturated-liquid line 36 and a saturated-vapor line 38. The area represented by numeral 40 to the left of the saturated-liquid line 36 is commonly refereed to as the subcooling region and the area 42 to the right of the saturated-vapor line 38 is commonly called the super-heated-vapor region. Finally, the area represented by the numeral 44 contained within the vapor dome between the saturated-liquid line 36 and the saturated-vapor line 38, is commonly called the mixed-phase region.

A refrigeration cycle of a heat pump 13 includes a compressor 14 that compresses a refrigerant from a saturated-vapor state represented by point 1 on the diagram to a superheated-vapor state represented by point 2a thereby increasing the temperature, enthalpy and pressure of the refrigerant. The refrigerant then flows through the condenser 16 wherein the enthalpy of the refrigerant is reduced at a constant pressure thereby causing the refrigerant to change from a superheated-vapor state to a saturated-liquid state, represented by point 3a of the diagram. The refrigerant flows through a throttling device 18 which reduces the pressure of the refrigerant at constant enthalpy to a mixed-phase state represented by point 4a. The refrigerant then flows through the evaporator 20 which increases the enthalpy of the refrigerant at a constant pressure until the refrigerant is again in a saturated-vapor state represented by point 1 on the diagram. In actual practice, it is well known that the compressor 14 compresses the refrigerant to a higher superheated-vapor region represented by point 2a on the diagram. The refrigerant then flows through the condenser 16 along line 46 until the refrigerant is in a saturated-liquid state. It is noted that line 46 gradually slopes from point 2a to point 3a.

In the heating mode, the refrigeration cycle of the heat pump 12 having the (now) postheat/subcool system 10 incorporated therein is described as follows. After the refrigerant is postheated by the fluid passing through the postheater from point 1 to point 1b it is compressed by compressor 14 to a superheated-vapor state represented by point 2b, the water flowing into the input 32 of the (now) postheater 24 causes the temperature of the refrigerant to be increased, as represented by line 48. Such postheating causes the refrigerant to be increased from its unmodified superheated-vapor state to a higher superheated-vapor state represented by point 1b. It is noted that by increasing the flow rate of the water through the (now) postheater 24, the postheater 24 can further increase the superheated temperature of the refrigerant thereby causing the refrigerant at the compressed superheated state to increase in temperature and pressure. Accordingly, the shaded area 50 between line 46 and 48 and shaded area 66 between line from 1 to 2a and line between 1b and 2b as well as the shaded area 52 between line from point 1 to point 4 and line from point 1b to point 4a illustrates the magnitude of the increased efficiency of the heat pump 12 having the postheater 24 and subcooler 26 incorporated therein.

The subcooler 26 operates to subcool the refrigerant being discharged from the condenser 16 thereby causing the refrigerant to change from a saturated-liquid state represented by point 3b on the diagram to a subcooled state represented by point 3c. The refrigerant then flows through the throttling device 18 which causes the refrigerant to change from a subcooled state to a mixed-phase state, represented by point 4a on the diagram. Accordingly, the shaded area 64 on the diagram illustrates the increased efficiency of the heat pump 12 having the subcooler 26 incorporated therein. The degree of subcooling is dependent upon the flow rate of the water through the input 28 of the subcooler 26 and the temperature of the cooling fluid. The heat that is absorbed from the liquid refrigerant is reintroduced to the refrigerant in the postheater 24 with results as described in the previous paragraph. When the evaporator (outdoor coil in heat mode) 20 of the heat pump 12 is exposed to low outside temperatures, the evaporator 20 may only evaporate the refrigerant to a mixed-phase state composed primarily of liquid, represented by point 1a. When this occurs, the postheater 24 warm the refrigerant to assure that the refrigerant changes to at least a saturated-vapor state or further to a superheated state. The size of the shaded areas 52, 66, & 50 representing the increased efficiency of the heat pump 12 in the heating mode is therefore greatly increased.

It should be appreciated that the postheater 24 and the subcooler 26 result in an increase of the temperature of the refrigerant as the refrigerant passes there through, with the bulk of the phase change of the refrigerant being accomplished by the evaporator 20. Accordingly, the flow rate of the water circulated through the subcooler 26 and the postheater 24 especially with the reclaim of heat from the liquid refrigerant to the evaporating/superheating refrigerant needed for maximum efficiency of the refrigeration cycle is greatly reduced from that amount of water needed for a standard straight (water source) water-heated evaporator.

Figure 4:
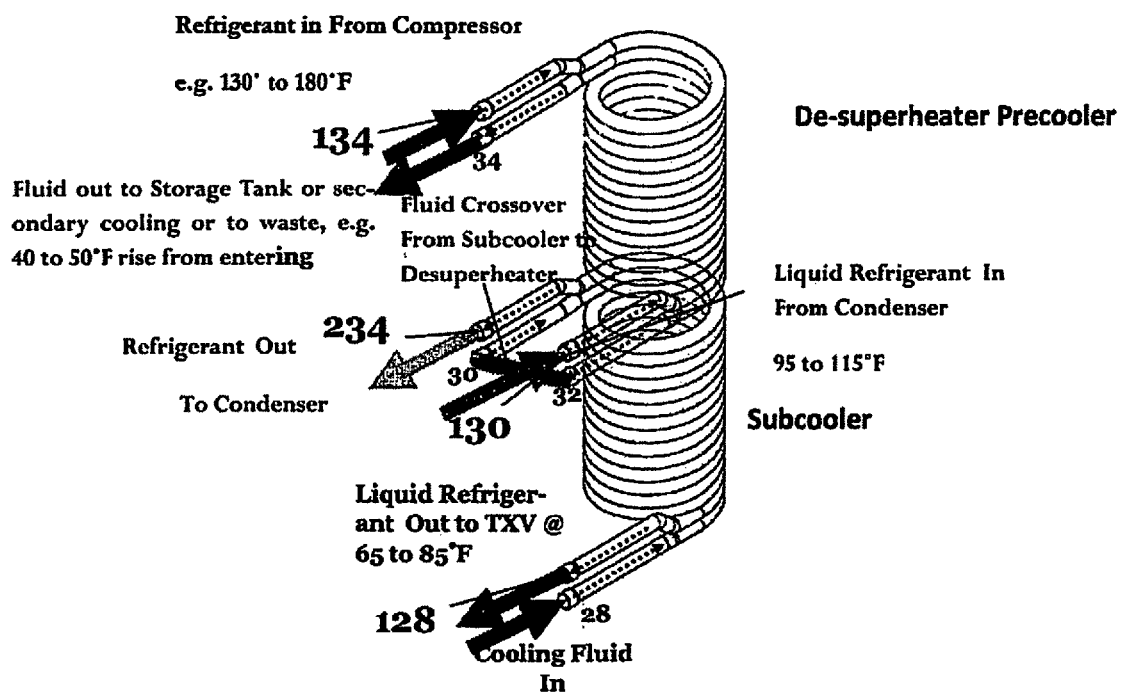
FIG. 4 is a perspective view of a vertically coupled version of the hybrid subcool/precool (postheat) heat recovery unit.

FIG. 4 is a perspective cut-away view of the coils and connections only of the vertically coupled version of the hybrid subcool/precool (postheat) heat recovery unit, where it can be seen that the de-superheater (precooler/postheater) sits above the subcooler, and the cooling fluid is introduced to the subcooler via point 28, the fluid flows through the subcooler and exits at point 30 and crosses over to enter the precooler at point 32, where the fluid flows through the precooler to exit at point 34. Hot gas refrigerant enters the precooler at point 34a and exits in a cooled desuperheated state (typically @ phase change temperature) at point 34b. Liquid refrigerant enters the subcooler at point 30a and exits the subcooler in a subcooled state at point 28a.

Figure 4A:
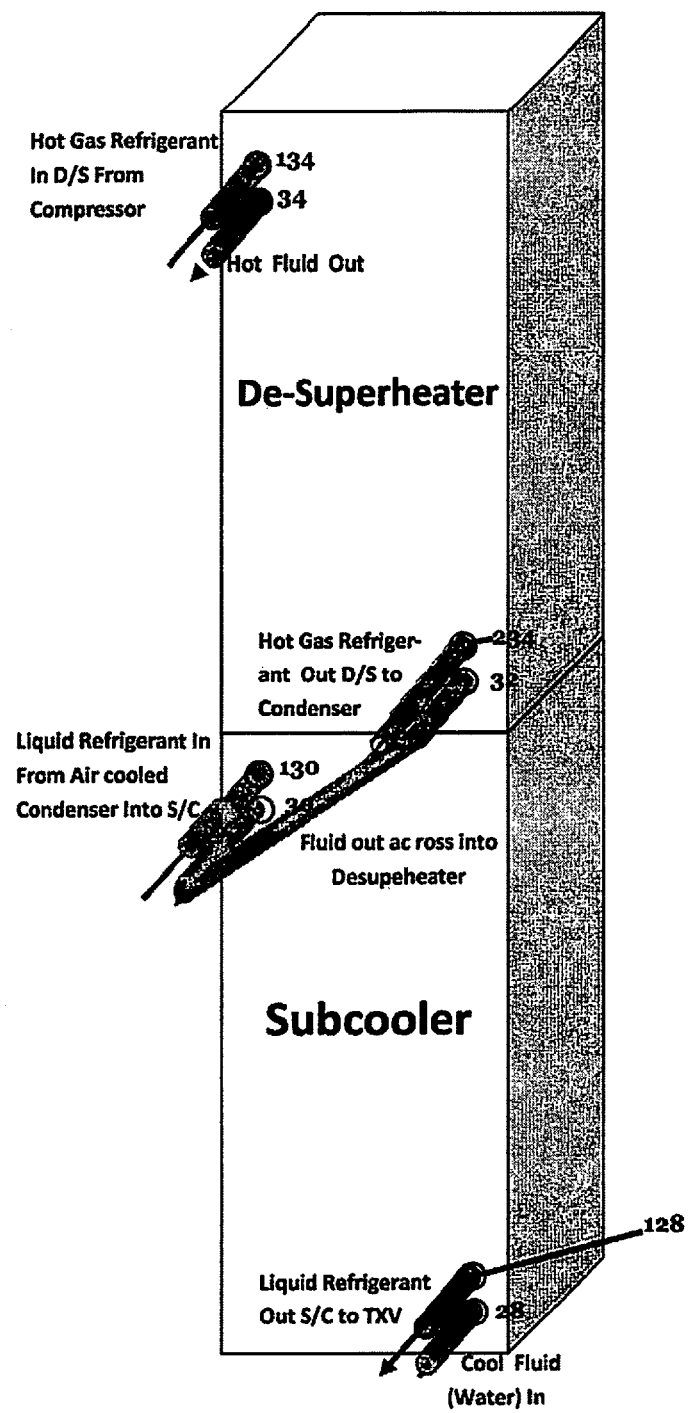
FIG. 4A is a perspective view of the assembled cabinet and coils of FIG. 4.
Figure 5:
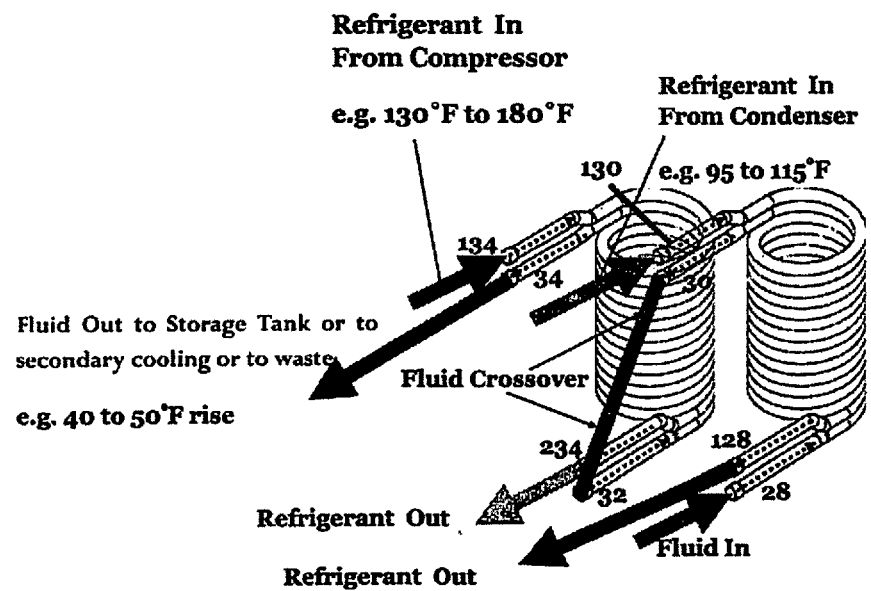
FIG. 5 is a perspective cut-away view of the horizontally coupled version of the hybrid subcool/precool (postheat) heat recovery unit.

FIG. 4A is a perspective view of the assembled cabinet of FIG. 4, where it can be seen that the de-superheater (precooler/postheater) sits above the subcooler, and the cooling fluid is introduced to the subcooler via point 28, the fluid flows through the subcooler and exits at point 30 and crosses over to enter the precooler at point 32, where the fluid flows through the precooler to exit at point 34. Hot gas refrigerant enters the precooler at point 34a and exits in a cooled desuperheated state (typically @ phase change temperature) at point 34b. Liquid refrigerant enters the subcooler at point 30a and exits the subcooler in a subcooled state at point 28a FIG. 5 is a perspective cut-away view of the coils and connections only of the horizontally coupled version of the hybrid subcool/precool (postheat) heat recovery unit. where it can be seen that the de-superheater (precooler/postheater) sits to the left of the subcooler, and the cooling fluid is introduced to the subcooler via point 28, the fluid flows through the subcooler and exits at point 30 and crosses over to enter the precooler at point 32, where the fluid flows through the precooler to exit at point 34. Hot gas refrigerant enters the precooler at point 34a and exits in a cooled desuperheated state (typically @ phase change temperature) at point 34b. Liquid refrigerant enters the subcooler at point 30a and exits the subcooler in a subcooled state at point 28a.

Figure 5A:
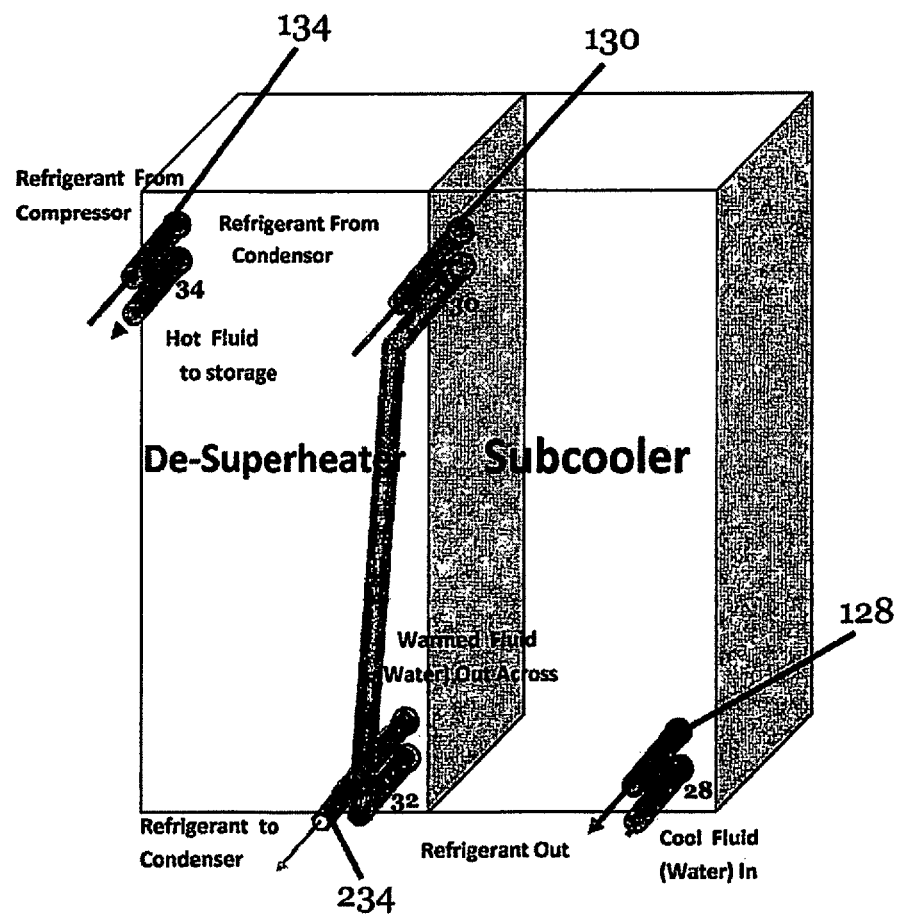
FIG. 5A is a perspective view of the assembled cabinet and coils of FIG. 5.

FIG. 5A is a perspective view of the assembled cabinet and coils of FIG. 5. where it can be seen that the de-superheater (precooler/postheater) sits to the left of the subcooler, and the cooling fluid is introduced to the subcooler via point 28, the fluid flows through the subcooler and exits at point 30 and crosses over to enter the precooler at point 32, where the fluid flows through the precooler to exit at point 34. Hot gas refrigerant enters the precooler at point 34a and exits in a cooled desuperheated state (typically @ phase change temperature) at point 34b. Liquid refrigerant enters the subcooler at point 30a and exits the subcooler in a subcooled state at point 28a.

Figure 5B:
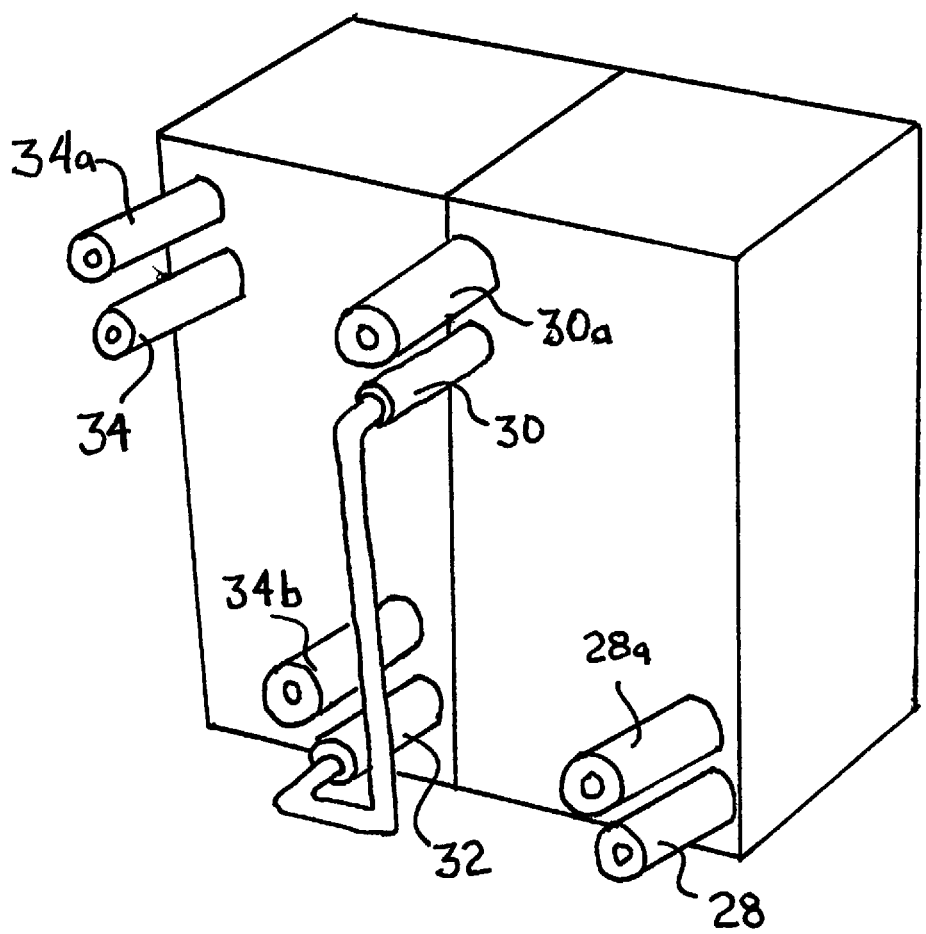
FIG. 5B is a perspective view of the assembled cabinet with labels and coils of FIG. 5.

FIG. 5B is a perspective view of the assembled cabinet with labels and coils of FIG. 5. where it can be seen that the de-superheater (precooler/postheater) sits to the left of the subcooler, and the cooling fluid is introduced to the subcooler via point 28, the fluid flows through the subcooler and exits at point 30 and crosses over to enter the precooler at point 32, where the fluid flows through the precooler to exit at point 34. Hot gas refrigerant enters the precooler at point 34a and exits in a cooled desuperheated state (typically @ phase change temperature) at point 34b. Liquid refrigerant enters the subcooler at point 30a and exits the subcooler in a subcooled state at point 28a.

Figure 6:
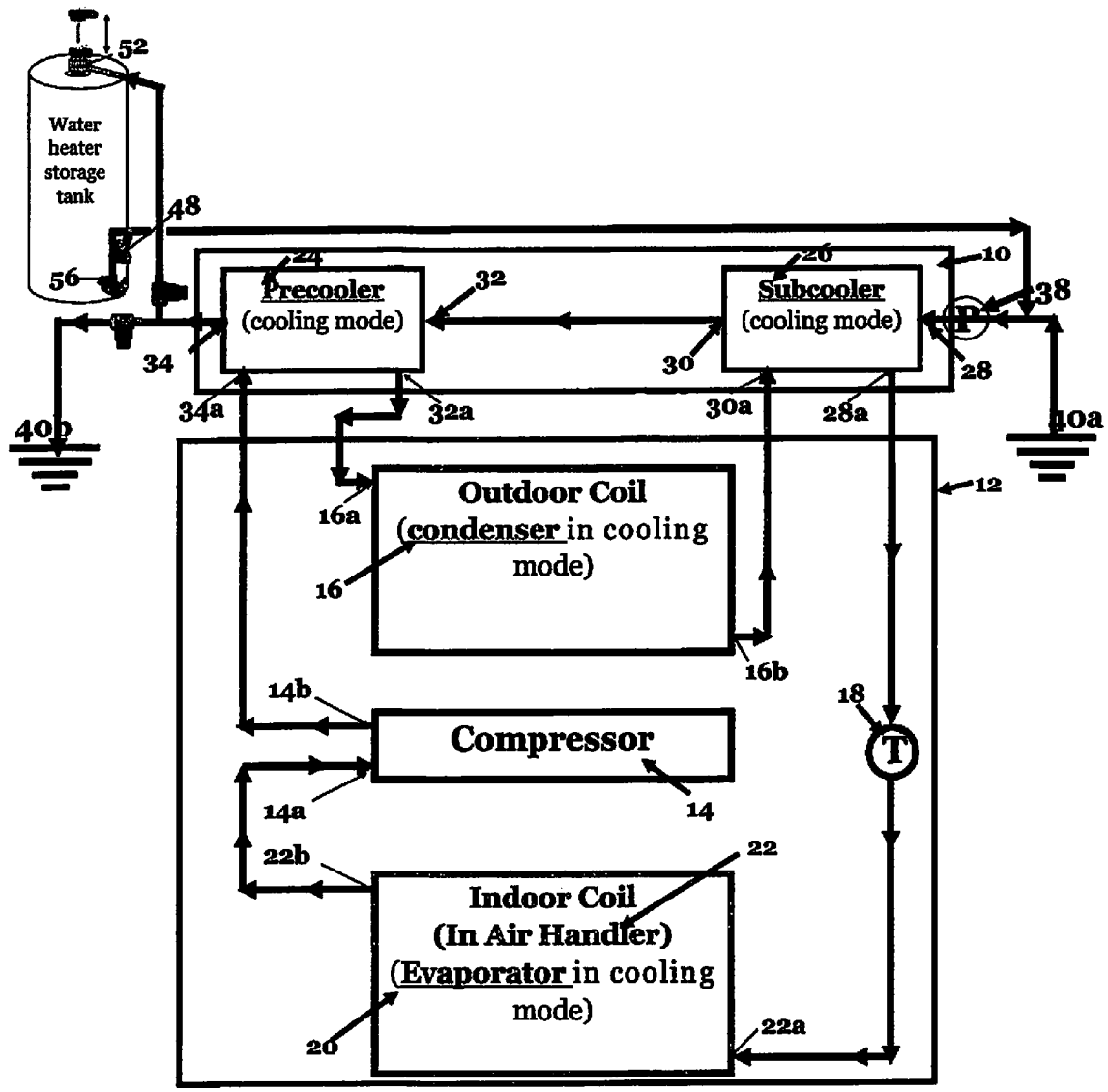
FIG. 6 is a block diagram illustrating relative positions of an example of the components of a system.
Figure 6A:
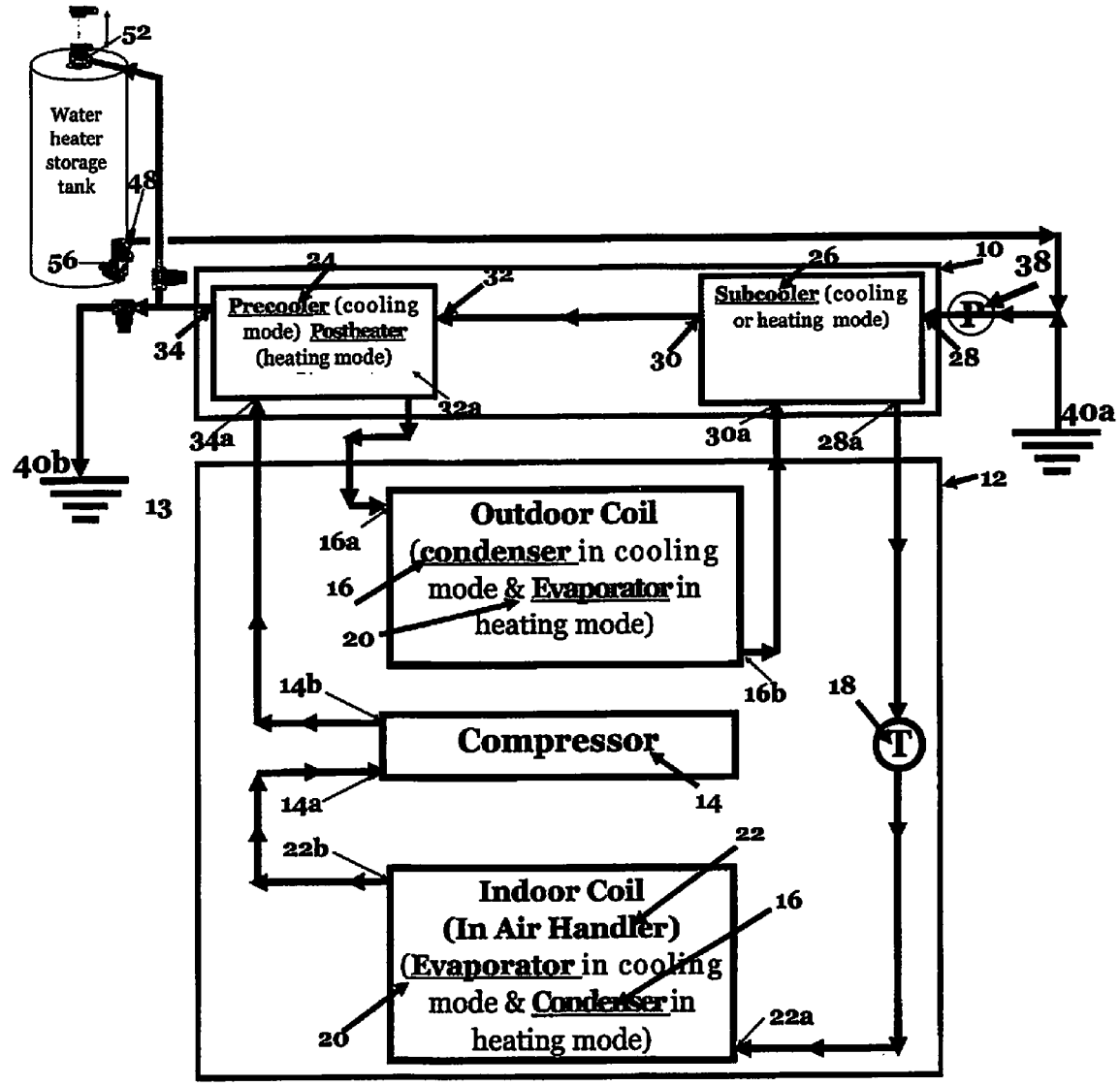
FIG. 6A is a block diagram illustrating relative positions of another example of the components of a system.
Figure 6B:
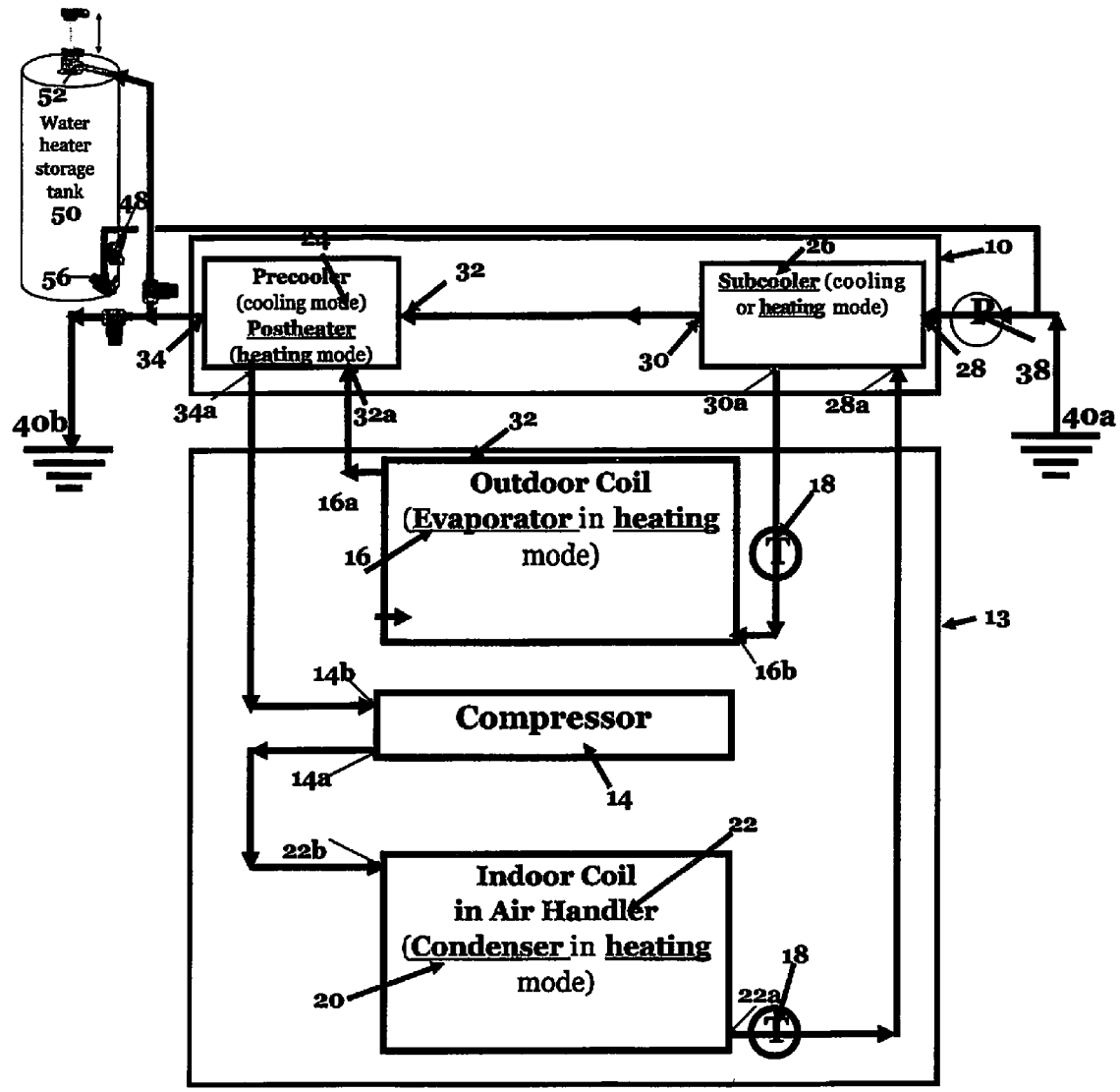
FIG. 6B is a block diagram illustrating relative positions of another example of the components of a system.
Figure 6C:
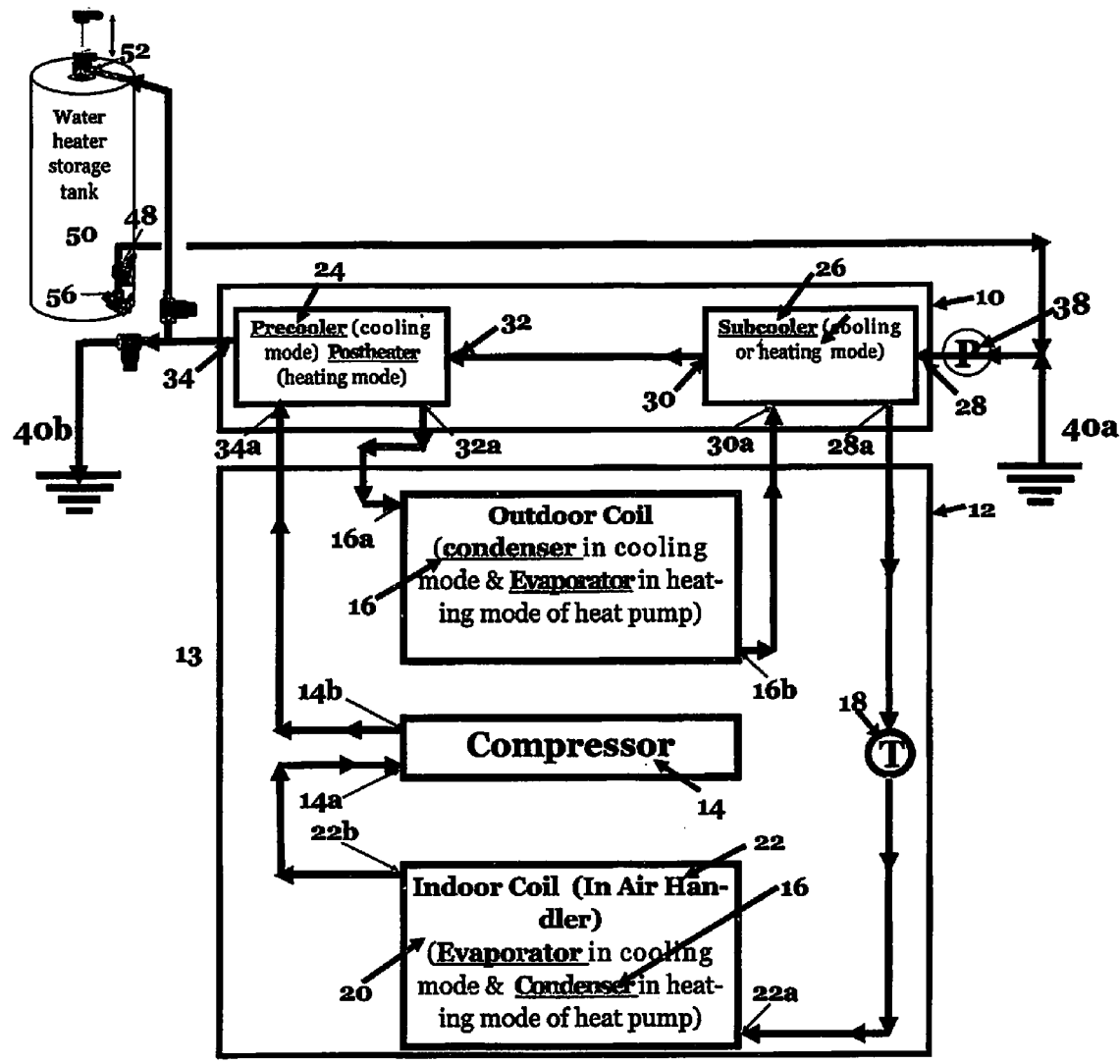
FIG. 6C is a block diagram illustrating relative positions of another example of the components of a system.
Figure 6D:
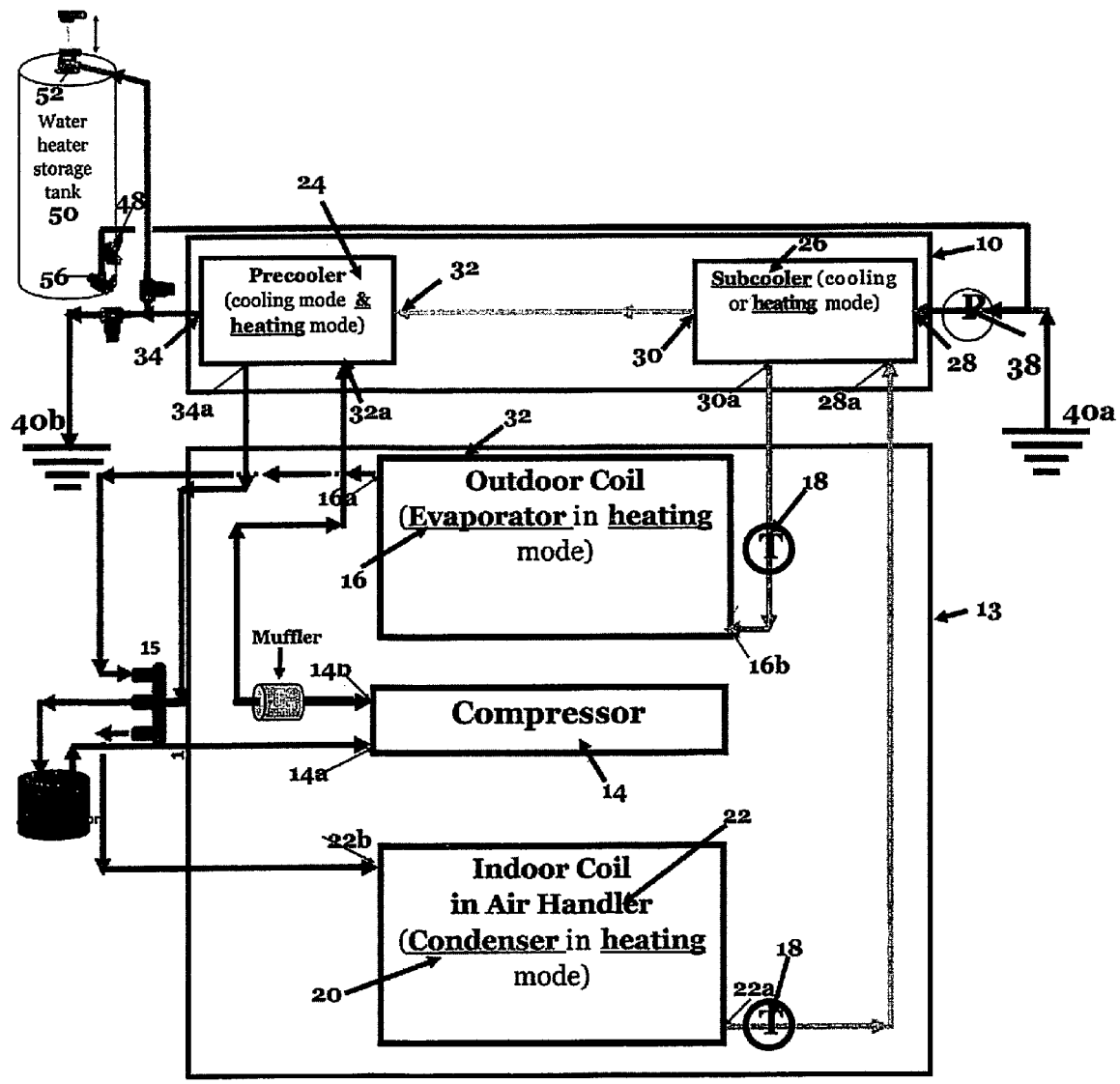
FIG. 6D is a block diagram illustrating relative positions of another example of the components of a system.

FIG. 6 is a block diagram illustrating the relative positions of all the components of a straight cool A/C or refrigeration system and the components of the hybrid heat recovery, precool/subcool system, where the cooling fluid enters the subcooler at point 28 from the bottom of a water heater or from a secondary cooling source 40a by a pump 38 (or thermosyphonic action, then passes through the subcool heat exchanger counterflow to the direction of the liquid refrigerant that entered at point 30a and exited at point 28a, the slightly warmed fluid exits the subcooler 26 at point 30 and enters the precooler/desuperheater at point 32 where the fluid flows counterflow to the gas refrigerant flow that entered at point 34a and exits at point 32a. The heated fluid exiting the precooler at point 34 then flows to enter the water heater storage tank at point 52 unless the water temperature exiting the bottom of the water heater storage tank at point 56 exceeds 90° F. as sensed by a thermostat valve located at point 48, in which case the hot fluid is directed to a secondary cooling source 40b such as a geothermal heat exchange, an evaporative cooler, a storage tank and night sky black body radiator system or to discharge.

FIG. 6 A. Is a block diagram illustrating the relative positions of all the components of a heat pump system 13 (does not show the reversing valve 15) and the components of the hybrid heat recovery, precool/subcool system, where the precooler/postheater of the hybrid system is located between the outdoor coil and the compressor. (cooling mode of heat pump) where the cooling fluid enters the subcooler at point 28 from the bottom of a water heater or from a secondary cooling source 40a by a pump 38 (or thermosyphonic action, then passes through the subcool heat exchanger counterflow to the direction of the liquid refrigerant that entered at point 30a and exited at point 28a, the slightly warmed fluid exits the subcooler 26 at point 30 and enters the precooler/desuperheater at point 32 where the fluid flows counterflow to the gas refrigerant flow that entered at point 34a and exits at point 32a. The heated fluid exiting the precooler at point 34 then flows to enter the water heater storage tank at point 52 unless the water temperature exiting the bottom of the water heater storage tank at point 56 exceeds 90° F. as sensed by a thermostat valve located at point 48, in which case the hot fluid is directed to a secondary cooling source 40b such as a geothermal heat exchange, an evaporative cooler, a storage tank and night sky black body radiator system or to discharge.

FIG. 6 B. Is a block diagram illustrating the relative positions of all the components of a heat pump system 13 (except the reversing valve 15) and the components of the hybrid heat recovery, postheat/subcool system,) where the postheater of the hybrid system is located between the outdoor coil (evaporator) and the compressor. (heating mode of heat pump) where the tempering fluid enters the subcooler at point 28 from the secondary tempering source 40a by a pump 38, then passes through the subcool heat exchanger common flow to the direction of the liquid refrigerant that entered at point 28a and exited at point 30a, the slightly warmed fluid exits the subcooler 26 at point 30 and enters the postheater at point 32 where the fluid flows common flow to the suction gas refrigerant flow that entered at point 32a and exits at point 34a. The heat exchange fluid exiting the postheater at point 34 then flows directly to the secondary tempering source 40b such as a geothermal heat exchange; a storage tank and solar collector system; or to discharge.

FIG. 6 C. Is a block diagram illustrating the relative positions of all the components of a heat pump system 13 (except the reversing valve 15) and the components of the hybrid heat recovery, precool/subcool system, where the precooler/postheater of the hybrid system is located between the outdoor coil and the compressor. (in the cooling mode of heat pump; a straight cool A/C system or a refrigeration system) where the cooling fluid enters the subcooler at point 28 from the bottom of a water heater or from a secondary cooling source 40a by a pump 38 (or thermosyphonic action, then passes through the subcool heat exchanger counterflow to the direction of the liquid refrigerant that entered at point 30a and exited at point 28a, the slightly warmed fluid exits the subcooler 26 at point 30 and enters the precooler/desuperheater at point 32 where the fluid flows counterflow to the gas refrigerant flow that entered at point 34a and exits at point 32a. The heated fluid exiting the precooler at point 34 then flows to enter the water heater storage tank at point 52 unless the water temperature exiting the bottom of the water heater storage tank at point 56 exceeds 90° F. as sensed by a thermostat valve located at point 48, in which case the hot fluid is directed to a secondary cooling source 40b such as a geothermal heat exchange, an evaporative cooler, a storage tank and night sky black body radiator system or to discharge.

FIG. 6 D. is a block diagram illustrating the relative positions of all the components of a heat pump system 13 (including the reversing valve 15) and the components of the hybrid heat recovery, precool/subcool system,) where the precooler 24 of the hybrid system is located between the compressor 14 and the reversing valve 15. (in heating mode of heat pump) where the tempering fluid enters the subcooler 26 at point 28 from the secondary tempering source 40a by a pump 38, then passes through the subcool heat exchanger common flow to the direction of the liquid refrigerant that entered at point 28a and exited at point 30a, the slightly warmed fluid exits the subcooler 26 at point 30 and enters the precooler 24 at point 32 where the heat exchange fluid flows common flow to the hot gas refrigerant flow that entered at point 32a and exits at point 34a. The heat exchange fluid exiting the precooler at point 34, then flows to enter the water heater storage tank at point 52 unless the water temperature exiting the bottom of the water heater storage task at point 56 exceeds 90° F. as sensed by a thermostat valve located at point 48, in which case the heat exchange fluid is directed to the secondary tempering source 40b such as a geothermal heat exchange; a storage tank and night sky black body radiator system; or to discharge.

This detailed description provides examples including features and elements of the claims for the purpose of enabling a person having ordinary skill in the art to make and use the inventions recited in the claims. However, these examples are not intended to limit the scope of the claims, directly. Instead, the examples provide features and elements of the claims that, having been disclosed in these descriptions, claims and drawings, may be altered and combined in ways that are known in the art.

What is claimed is:

1. A thermal recovery system using a refrigerant comprises:
   a condensor having an inlet and an outlet, wherein the refrigerant is capable of entering the inlet and exiting the outlet;
   a subcooler comprising a first heat exchanger coupled in fluid communication with the outlet of the condenser, wherein the refrigerant flows through the subcooler after exiting the outlet of the condenser, and a first working fluid flows through the subcooler in a heat exchanging relationship with the refrigerant, without mixing with the refrigerant, whereby the refrigerant is subcooled;

a precooler comprising a second heat exchanger coupled in fluid communication with the inlet of the condenser, wherein the refrigerant flows through the second heat exchanger of the precooler before entering the inlet of the condenser, and the heat exchanger of the precooler is coupled in fluid communication with the heat exchanger of the subcooler such that the first working fluid flows through the precooler, as a second working fluid, in a heat exchanging relationship with the refrigerant, without mixing with the refrigerant, after first flowing through the subcooler, as the first working fluid, whereby the refrigerant is precooled; and wherein the second working fluid is dispensed as potable hot water, or the precooler is coupled to a hot water system, and the hot water system comprises a heat exchanger, such that the second working fluid flows through the heat exchanger of the hot water system, such that potable water of the hot water system is heated.

2. The system of claim 1, wherein the heat exchanger of the subcooler is a tube on tube heat exchanger.

3. The system of claim 2, wherein the heat exchanger of the precooler is a tube on tube heat exchanger.

4. The system of claim 1, further comprising a valve system, and the valve system controls the flow rate of the first working fluid and the second working fluid such that the refrigerant is subcooled to a substantially subcooled-liquid-state and is precooled to a substantially saturated-vapor-state.

5. The system of claim 3, wherein the heat exchanger of the precooler is arranged such that a direction of a flow of the second working fluid is in a counter current flow direction with a direction of a flow of the refrigerant flowing through the heat exchanger.

6. The system of claim 1, wherein the second working fluid is dispensed as potable hot water.

7. The system of claim 1, wherein the precooler is coupled to a hot water system, and the hot water system comprises a heat exchanger, such that the second working fluid flows through the heat exchanger of the hot water system, such that potable water of the hot water system is heated.

8. The system of claim 7, wherein the valve system comprises a controller such that a temperature of the first working fluid before entering the subcooler is fifty degrees less than a temperature of the second working fluid exiting the precooler.

9. A method for increasing the efficiency and cooling capacity of a refrigeration system comprising the thermal recovery system of claim 1, the method comprising:

subcooling the refrigerant flowing from the condenser through the subcooler of the thermal recovery system of claim 1;

precooling the refrigerant prior to the refrigerant flowing through the condenser of the thermal recovery system of claim 1;

controlling the temperature increase of the first working fluid and the second working fluid such that the second working fluid has a temperature less than a hot gas temperature of the refrigerant when the second working fluid is in heat exchanging relationship with the refrigerant, whereby a temperature of the refrigerant is decreased.

10. The method of claim 9, wherein the step of controlling decreases the temperature of the refrigerant to greater than or about the refrigerant's saturated-vapor-state.

11. The method of claim 9, wherein the step of controlling decreases the temperature of the refrigerant such that some phase change of the refrigerant occurs before the refrigerant enters the condenser.

12. The method of claim 9, wherein the step of controlling regulates the flow rate of the first working fluid and the second working fluid, such that the refrigerant flowing from the condenser is subcooled to a subcooled-liquid-state and the refrigerant flowing into the condenser is precooled to a saturated-vapor-state or cooler.

13. The method of claim 9, further comprising providing the second working fluid to a storage tank for use as potable hot water.

14. The method of claim 9, further comprising evaporative cooling of the second working fluid exiting the heat exchanger of the precooler using condensate discharge from an air conditioning unit as the source of water being evaporated.

15. A refrigeration system comprising the thermal recovery system of claim 1.

16. An air conditioning system comprising the thermal recovery system of claim 1.

* * * * *